United States Patent
Ishihara et al.

(10) Patent No.: US 11,384,875 B2
(45) Date of Patent: Jul. 12, 2022

(54) PIPE JOINT, SEPARATION PREVENTION MEMBER, AND METHOD OF CONNECTING PIPES

(71) Applicant: Kubota Corporation, Osaka (JP)

(72) Inventors: Takahiro Ishihara, Amagasaki (JP); Shogo Kaneko, Amagasaki (JP); Kazuya Ito, Amagasaki (JP); Shota Yamada, Amagasaki (JP); Yuki Hieda, Amagasaki (JP)

(73) Assignee: KUBOTA CORPORATION, Hyogo (JP)

( * ) Notice: Subject to any disclaimer, the term of this patent is extended or adjusted under 35 U.S.C. 154(b) by 709 days.

(21) Appl. No.: 16/088,482

(22) PCT Filed: Mar. 6, 2017

(86) PCT No.: PCT/JP2017/008701
§ 371 (c)(1),
(2) Date: Sep. 26, 2018

(87) PCT Pub. No.: WO2017/169531
PCT Pub. Date: Oct. 5, 2017

(65) Prior Publication Data
US 2019/0137017 A1    May 9, 2019

(30) Foreign Application Priority Data

Mar. 28, 2016 (JP) ............................. JP2016-062927
Mar. 28, 2016 (JP) ............................. JP2016-062928
Mar. 28, 2016 (JP) ............................. JP2016-062929

(51) Int. Cl.
*F16L 21/04* (2006.01)
*F16L 23/032* (2006.01)
(Continued)

(52) U.S. Cl.
CPC ............... *F16L 21/04* (2013.01); *F16L 21/08* (2013.01); *F16L 23/032* (2013.01); *F16L 23/22* (2013.01)

(58) Field of Classification Search
CPC ......... F16L 21/04; F16L 23/032; F16L 23/22; F16L 21/08; F16L 23/12; F16L 21/035
(Continued)

(56) References Cited

U.S. PATENT DOCUMENTS 3,751,078 A * 8/1973 O'Brian .................. F16L 21/04
                                                    285/339
4,170,375 A * 10/1979 Ito .......................... F16L 21/08
                                                    277/621
(Continued)

FOREIGN PATENT DOCUMENTS

JP    S5186821 U    7/1976
JP    S55-115486   8/1980
(Continued)

OTHER PUBLICATIONS

International Preliminary Report on Patentability dated Oct. 11, 2018.
(Continued)

*Primary Examiner* — James M Hewitt, II
(74) *Attorney, Agent, or Firm* — Harness, Dickey & Pierce, P.L.C.

(57) ABSTRACT

A pipe joint includes: a sealing member, having an annular shape, which is provided between the outer circumferential surface of a spigot and an inner circumferential surface of a socket; a pushing ring to push the sealing member into the socket, the pushing ring being fitted onto the spigot; and a separation preventive member configured to engage with the spigot protrusion part in a pipe-axial direction to prevent a separation of the spigot from the socket. The separation
(Continued)

preventive member is provided between an inner circumferential surface of the pushing ring and the outer circumferential surface of the spigot. The sealing member is provided along an outer circumferential surface of the spigot protrusion part and includes a compression part. The compression part is compressed in a pipe-radial and is located, in the socket, upstream of the spigot protrusion part in an insertion direction in which the spigot is inserted.

14 Claims, 22 Drawing Sheets

(51) Int. Cl.
*F16L 23/22* (2006.01)
*F16L 21/08* (2006.01)

(58) Field of Classification Search
USPC .......................................................... 285/337
See application file for complete search history.

(56) References Cited

U.S. PATENT DOCUMENTS

| | | | |
|---|---|---|---|
| 4,303,262 A * | 12/1981 | Pierrel | F16L 21/08 |
| | | | 285/232 |
| 4,930,816 A * | 6/1990 | Biing-Yih | B25B 13/02 |
| | | | 285/133.4 |
| 2005/0218652 A1* | 10/2005 | Sakamoto | F16L 21/04 |
| | | | 285/343 |

FOREIGN PATENT DOCUMENTS

| | | |
|---|---|---|
| JP | H03-044292 | 7/1991 |
| JP | H 03-177687 | 12/1991 |
| JP | H11-325345 | 11/1999 |
| JP | H11-325348 | 11/1999 |
| JP | 2001-050446 | 2/2001 |
| JP | 2001-173852 | 6/2001 |
| JP | 2002-005359 | 1/2002 |
| JP | 2002-005361 | 1/2002 |
| JP | 2004-232679 A | 8/2004 |
| JP | 2005-140138 | 6/2005 |
| JP | 2008-39122 | 2/2008 |
| JP | 2008-196607 A | 8/2008 |
| JP | 2008-309276 A | 12/2008 |
| JP | 2010-196891 | 9/2010 |
| JP | 2010-203580 A | 9/2010 |
| JP | 2011-002091 | 1/2011 |
| JP | 2011-012779 | 1/2011 |
| JP | 2011-099515 | 5/2011 |
| JP | 2014-005868 | 1/2014 |
| JP | 2014-206216 | 10/2014 |
| JP | 2015-143524 A | 8/2015 |
| JP | 2012-255491 | 12/2021 |

OTHER PUBLICATIONS

International Search Report PCT/ISA/210 for International Application No. PCT/JP2017/008701 dated Jun. 6, 2017.

* cited by examiner

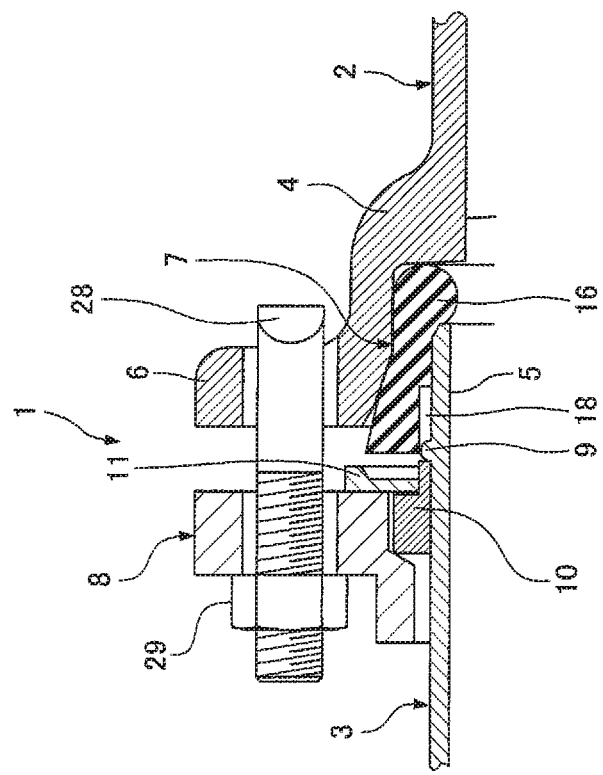
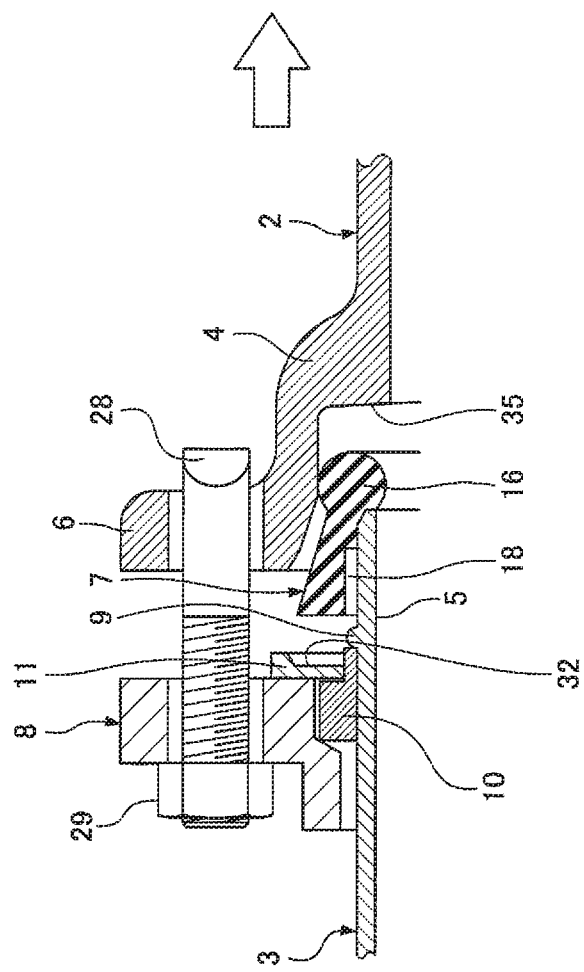
FIG. 12

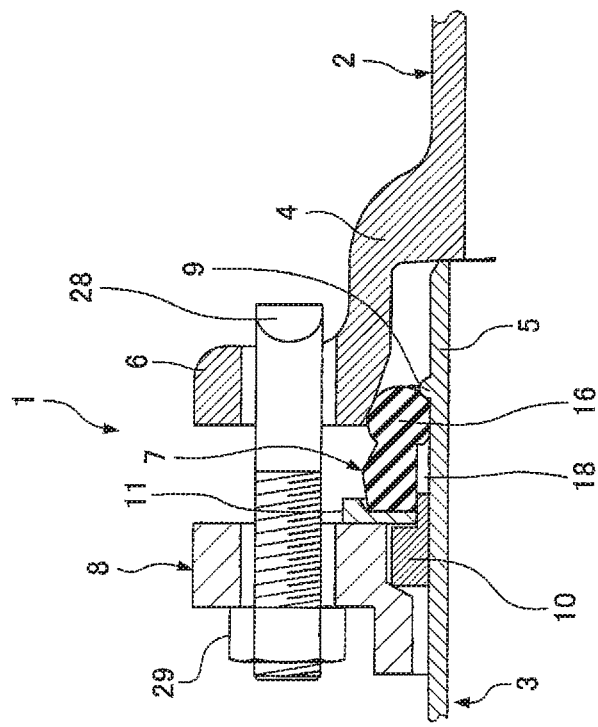
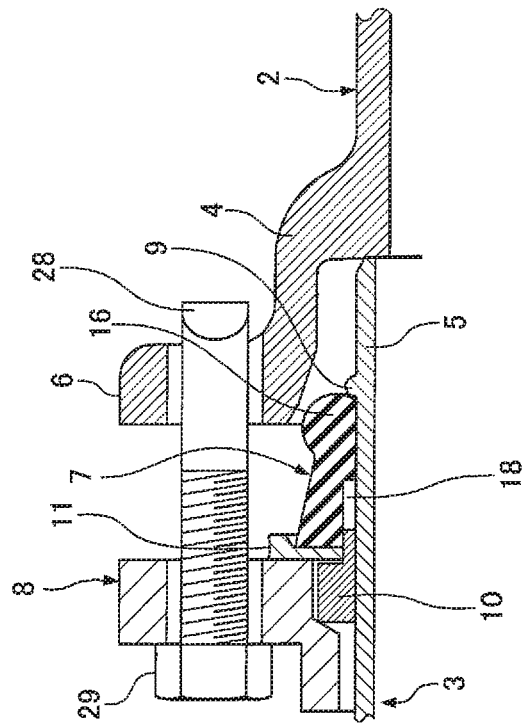
FIG. 13 ns. 2016-062927, 2016-062928, and 2016-062929 each
PIPE JOINT, SEPARATION PREVENTION MEMBER, AND METHOD OF CONNECTING PIPES This application is the national phase under 35 U.S.C. § 371 of PCT International Application No. PCT/JP2017/008701 which has an International filing date of Mar. 6, 2017, which designated the United States of America and claims priority under 35 U.S.C. § 119 on Patent Application Nos. 2016-062927, 2016-062928, and 2016-062929 each filed in Japan on Mar. 28, 2016, the entire contents of each of which are hereby incorporated by reference.

TECHNICAL FIELD

The present invention relates to (i) a pipe joint for use in connecting pipes, (ii) a separation preventive member provided in the pipe joint, and (iii) a method of connecting pipes.

BACKGROUND ART

Examples of a conventional pipe joint include a pipe joint having a configuration as illustrated in FIG. 19. According to a configuration of such a pipe joint, (i) a spigot 104 provided at an end of a pipe 103 is inserted in a socket 102 which is provided at an end of a pipe 101, (ii) an annular sealing member 105 is provided between an outer circumferential surface of the spigot 104 and an inner circumferential surface of the socket 102, and (iii) a pushing ring 106 for deeply pushing the sealing member 105 into the socket 102 is fitted onto the spigot 104 so as to face an opening end part of the socket 102 from the outside.

The spigot 104 has a spigot protrusion part 107 along its outer circumferential surface. An annular locking member 108 is provided between an inner circumferential surface of the pushing ring 106 and the outer circumferential surface of the spigot 104. The locking member 108 engages with the spigot protrusion part 107 in a pipe-axial direction so as to prevent a separation of the spigot 104 from the socket 102.

When the pipe joint is viewed in the pipe-axial direction, the spigot protrusion part 107 is provided so as to be away from the sealing member 105 in a separation direction A of the spigot 104. The pushing ring 106 and the socket 102 are fastened to each other with a plurality of bolts and nuts 109 so that the pushing ring 106 deeply pushes, via the locking member 108, the sealing member 105 into the socket 102.

With the configuration, a gap between the spigot 104 and the socket 102 is filled with the sealing member 105. This makes it possible to prevent a fluid in the pipes 101 and 103 from leaking out from between the spigot 104 and the socket 102. Furthermore, the sealing member 105 is deeply pushed into the socket 102 by the pushing ring 106 via the locking member 108. This makes it possible to prevent the sealing member 105 from being pushed out of the socket 102 due to, for example, a fluid pressure in the pipes 101 and 103.

Moreover, even in a case where a separation force is caused to act on the spigot 104 due to, for example, earthquakes, it is possible to prevent the separation of the spigot 104 from the socket 102. This is because the spigot protrusion part 107 engages with the locking member 108 in the separation direction A.

An example of the above pipe joint 100 is disclosed in Patent Literature 1 listed below.

CITATION LIST

Patent Literature

[Patent Literature 1]
  Japanese Patent Application Publication Tokukai No. 2015-143524 (Publication date: Aug. 6, 2015)
[Patent Literature 2]
  Japanese Patent Application Publication Tokukai No. 2004-232679 (Publication date: Aug. 19, 2004)

SUMMARY OF INVENTION

Technical Problem

With the above conventional configuration, however, the spigot protrusion part 107 is provided so as to be away from the sealing member 105 in the separation direction of the spigot 104, in a state where the pipes 101 and 103 are being connected to each other by using the pipe joint 100. This causes an increase in length L1 of a part extending from a leading end part of the spigot 104 to the spigot protrusion part 107. Note that such a part of the spigot 104 is inserted in the socket 102. This causes an increase in length L2 of a part extending from an opening end part of the socket 102 to an inmost part 110 in the socket 102. This ultimately causes a problem of increasing, in the pipe-axial direction, a size of the socket 102, consequently a size of the pipe joint 100.

An object of the present invention is to provide (i) a pipe joint which can be downsized in the pipe-axial direction and (ii) a method of connecting pipes.

Solution to Problem

In order to attain the above object, a pipe joint in accordance with a first aspect of the present invention is a pipe joint for connecting a first pipe and a second pipe, the first pipe having a socket, the second pipe having a spigot, the spigot being inserted in the socket, the spigot having a spigot protrusion part along its outer circumferential surface, the pipe joint including: a sealing member, having an annular shape, which is provided between an outer circumferential surface of the spigot and an inner circumferential surface of the socket; a pushing ring configured to deeply push the sealing member into the socket, the pushing ring being fitted onto the spigot so as to face an opening end part of the socket from the outside; and a separation preventive member configured to engage with the spigot protrusion part in a pipe-axial direction so as to prevent a separation of the spigot from the socket, the separation preventive member being provided between an inner circumferential surface of the pushing ring and the outer circumferential surface of the spigot, the sealing member being provided along an outer circumferential surface of the spigot protrusion part and having a compression part sandwiched between the outer circumferential surface of the spigot and the inner circumferential surface of the socket, the compression part being compressed in a pipe-radial direction, the compression part being located, in the socket, upstream of the spigot protrusion part in an insertion direction in which the spigot is inserted.

According to the above configuration, the sealing member is provided along the outer circumferential surface of the spigot protrusion part while the pipes are being connected with use of the pipe joint. This allows the sealing member and the spigot protrusion part to overlap each other in the pipe-radial direction, and ultimately allows a reduction in length of a part extending from a leading end part of the spigot to the spigot protrusion part. It is therefore possible to reduce a length of a part extending from the opening end part of the socket to an inmost part in the socket. This ultimately allows the pipe joint to be downsized in the pipe-axial direction.

A pipe joint in accordance with a second aspect of the present invention is configured such that the sealing member has, on its inner circumferential surface, a first depressed part in which the spigot protrusion part is inserted in the insertion direction; and the first depressed part is provided so as to be located upstream of the compression part of the sealing member in a separation direction in which the spigot separates from the socket.

According to the above configuration, the sealing member is fitted to the outer circumferential surface of the spigot. The spigot is then moved in the insertion direction with respect to the sealing member so that the spigot protrusion part is inserted in the first depressed part. This makes it possible to easily locate the sealing member along the outer circumferential surface of the spigot protrusion part.

A pipe joint in accordance with a third aspect of the present invention is configured such that the separation preventive member is an annular member having a structure whose part is cut out; and the separation preventive member has a separation preventive body part and an engaging part, the separation preventive body part being located between the inner circumferential surface of the pushing ring and the outer circumferential surface of the spigot, the engaging part being engageable with the spigot protrusion part and protruding from the separation preventive body part in the insertion direction, the engaging part having a thickness, in the pipe-radial direction, which is thinner than a thickness, in the pipe-radial direction, of the separation preventive body part.

According to the above configuration, a diameter of the separation preventive member is expanded while the pipes are being connected. In so doing, the separation preventive member is fitted onto the outer circumferential surface of the spigot via the leading end part. The separation preventive member is then moved and gets through the spigot protrusion part so as to be located upstream of the spigot protrusion part in the separation direction of the spigot. After that, the diameter, of the separation preventive member, which has been expanded is shrunk (reduced). This allows the separation preventive member to be fitted onto the outer circumferential surface of the spigot.

The separation preventive member has a thickness which is thinner in the engaging part than in the separation preventive body part. Such a separation preventive member is prevented from being excessively rigid. This allows a reduction in force, which is required for expanding the diameter of the separation preventive member during pipe connection, and ultimately allows a reduction in time and effort for an operation of expanding the diameter of the separation preventive member. It is therefore possible to conduct an operation of pipe connection in a short period of time.

As such, even in a case where a separation force is caused to act on the spigot due to, for example, earthquakes after the first and second pipes are connected, it is possible to prevent the separation of the spigot from the socket because the spigot protrusion part will engage with the engaging part of the separation preventive member in the separation direction.

Note that, in order to stabilize an attachment posture of the separation preventive member, it is preferable to cause the separation preventive member to have a large width in the pipe-axial direction. Even in such a case, the above configuration allows a reduction in time and effort for the operation of expanding the diameter of the separation preventive member. It is therefore possible to conduct the operation of pipe connection in a short period of time.

A pipe joint in accordance with a fourth aspect of the present invention is configured such that the engaging part is inserted in the first depressed part of the sealing member in the insertion direction; and the spigot protrusion part is located, in the pipe-axial direction, between the compression part of the sealing member and the engaging part of the separation preventive member.

According to the above configuration, the engaging part of the separation preventive member is inserted in the first depressed part of the sealing member in the insertion direction of the spigot. An end part of the sealing member therefore becomes hard to deform inward in the pipe-radial direction. This causes the sealing member to be stabilized in shape, and ultimately makes it possible to prevent a deterioration in sealing performance (water-tightness) of sealing member.

A pipe joint in accordance with a fifth aspect of the present invention is configured to further include: a spacer provided between the sealing member and the pushing ring, the sealing member being deeply pushed into the socket by the pushing ring via the spacer, the spacer having a second depressed part on a side which makes contact with the sealing member, an end part of the sealing member being fitted in the second depressed part of the spacer.

According to the above configuration, the sealing member is deeply pushed into the socket by the pushing ring via the spacer. This makes it possible to prevent the sealing member from being pushed out of the socket due to, for example, a fluid pressure in the first and second pipes.

Note that, since an end part of the sealing member is fitted in the second depressed part of the spacer, it is possible to prevent the end part of the sealing member from being excessively deformed (moved) in the diameter-expanding direction. It is therefore possible to, while the pipes are being connected with use of the pipe joint, (i) prevent the end part of the sealing member from being caught between an opening end surface of the socket and the spacer and (ii) securely insert the sealing member between the outer circumferential surface of the spigot and the inner circumferential surface of the socket.

A pipe joint in accordance with a sixth aspect of the present invention is configured such that the socket has a flange at its opening end part; and the spacer is sandwiched between the pushing ring and the socket so as to cause the pushing ring to be away from the flange of the socket.

According to the above configuration, the spacer is sandwiched between the pushing ring and the socket. This makes it possible to fix the spacer at a given attachment position.

A pipe joint in accordance with a seventh aspect of the present invention is configured such that the spacer is an annular member; the second depressed part has an inner diameter which is greater than an inner diameter of the spacer; and the second depressed part has an outer diameter which is smaller than an outer diameter of the spacer.

A pipe joint in accordance with an eighth aspect of the present invention is a pipe joint for connecting a first pipe and a second pipe, the first pipe having a socket, the second pipe having a spigot, the spigot being inserted in the socket, the spigot having a spigot protrusion part along its outer circumferential surface, the pipe joint including: a separation preventive member, configured to prevent a separation of the spigot from the socket, which is fitted onto the spigot, the separation preventive member being an annular member having a structure whose part is cut out, the separation preventive member having a separation preventive body part and an engaging part, the engaging part being engageable with the spigot protrusion part and protruding from the separation preventive body part in an insertion direction in which the spigot is inserted, the engaging part having a thickness, in a pipe-radial direction, which is thinner than a thickness, in the pipe-radial direction, of the separation preventive body part.

According to the above configuration, a diameter of the separation preventive member is expanded while the pipes are being connected. In so doing, the separation preventive member is fitted onto the outer circumferential surface of the spigot via the leading end part. The separation preventive member is then moved and gets through the spigot protrusion part so as to be located upstream of the spigot protrusion part in the separation direction of the spigot. After that, the diameter, of the separation preventive member, which has been expanded is shrunk (reduced). This allows the separation preventive member to be fitted onto the outer circumferential surface of the spigot.

The separation preventive member has a thickness which is thinner in the engaging part than in the separation preventive body part. Such a separation preventive member is prevented from being excessively rigid. This allows a reduction in force, which is required for expanding the diameter of the separation preventive member during pipe connection, and ultimately allows a reduction in time and effort for an operation of expanding the diameter of the separation preventive member. It is therefore possible to conduct an operation of pipe connection in a short period of time.

As such, even in a case where a separation force is caused to act on the spigot due to, for example, earthquakes after the first and second pipes are connected, it is possible to prevent the separation of the spigot from the socket because the spigot protrusion part will engage with the engaging part of the separation preventive member in the separation direction.

Note that, in order to stabilize an attachment posture of the separation preventive member, it is preferable to cause the separation preventive member to have a large width in the pipe-axial direction. Even in such a case, the above configuration allows a reduction in time and effort for the operation of expanding the diameter of the separation preventive member. It is therefore possible to conduct the operation of pipe connection in a short period of time.

A pipe joint in accordance with a ninth aspect of the present invention is configured such that the separation preventive member has a thickness-reduced part for facilitating deformation in a diameter-expanding direction.

According to the above configuration, the thickness-reduced part prevents the separation preventive member from being excessively rigid. This allows a reduction in force, which is required for expanding the diameter of the separation preventive member during pipe connection, to be further reduced, and ultimately allows a reduction in time and effort for the operation of expanding the diameter of the separation preventive member. It is therefore possible to conduct an operation of pipe connection in a short period of time.

A pipe joint in accordance with a tenth aspect of the present invention is configured such that if the engaging part of the separation preventive member is set in an orientation, reverse to a normal orientation, in the pipe-axial direction, then a gap between the socket and the pushing ring is not set so as to be adjustable to a given gap.

According to the above configuration, in a case where the engaging part is erroneously set in an orientation, reverse to a normal orientation, while the separation preventive member is being fitted to the outer circumferential surface of the spigot, a gap between the socket and the pushing ring is not set so as to be adjustable to a given gap. This allows a worker to immediately recognize that the separation preventive member is reversely attached, so that the worker can correct the separation preventive member in the normal orientation.

A separation preventive member in accordance with an eleventh aspect of the present invention is a separation preventive member configured to prevent, in a pipe joint, a separation of a spigot of a second pipe from a socket of a first pipe, the pipe joint connecting the first pipe and the second pipe, the spigot being inserted in the socket, the spigot having a spigot protrusion part along its outer circumferential surface, the separation preventive member being an annular member having a structure whose part is cut out, the separation preventive member having a separation preventive body part and an engaging part, the separation preventive body part being fittable onto the spigot, the engaging part being engageable with the spigot protrusion part in a pipe-axial direction and protruding from the separation preventive body part in an insertion direction in which the spigot is inserted, the engaging part having a thickness, in a pipe-radial direction, which is thinner than a thickness, in the pipe-radial direction, of the separation preventive body part.

The separation preventive member has a thickness which is thinner in the engaging part than in the separation preventive body part. Such a separation preventive member is prevented from being excessively rigid. This allows a reduction in force, which is required for expanding the diameter of the separation preventive member during pipe connection, and ultimately allows a reduction in time and effort for an operation of expanding the diameter of the separation preventive member. It is therefore possible to conduct an operation of pipe connection in a short period of time.

A method of connecting pipes in accordance with a twelfth aspect of the present invention is a method of connecting pipes by using a pipe joint described in any one of the first through fifth aspects of the present invention, including the steps of: fitting the pushing ring onto the spigot so that the pushing ring is moved upstream of the spigot protrusion part in the separation direction; fitting the separation preventive member onto the spigot so that the separation preventive member is moved upstream of the spigot protrusion part in the separation direction so that the separation preventive member is located between the inner circumferential surface of the pushing ring and the outer circumferential surface of the spigot; fitting the sealing member onto the spigot so that the sealing member is located along the outer circumferential surface of the spigot protrusion part; and inserting the spigot in the socket while causing the pushing ring to push the sealing member.

The above method makes it possible to prevent, while inserting the spigot into the socket, (i) a mount failure that the compression part of the sealing member is caught between the leading end part of the spigot and the inmost part in the socket and (ii) a mount failure that the sealing member cannot be sufficiently inserted into the socket.

A method of connecting pipes in accordance with a thirteenth aspect of the present invention is a method of connecting pipes by using a pipe joint as described in any one of the fifth through seventh aspects of the present invention, including the steps of: fitting the pushing ring onto the spigot; fitting an end part of the sealing member in the second depressed part of the spacer so that the sealing member and the spacer are fitted onto the spigot; and inserting the spigot in the socket while causing the pushing ring to push the sealing member via the spacer.

According to the above method, an end part of the sealing member is fitted into the second depressed part of the spacer while the sealing member is being pushed by the pushing ring via the spacer. This makes it possible to prevent the end part of the sealing member from (i) being deformed in the diameter-expanding direction and (ii) being caught between the spacer and the opening end part of the socket.

Advantageous Effects of Invention

As described above, in an embodiment of the present invention, the sealing member is provided along the outer circumferential surface of the spigot protrusion part while the pipes are being connected with use of the pipe joint. This allows the sealing member and the spigot protrusion part to overlap each other in the pipe-radial direction, and ultimately allows a reduction in length of a part extending from a leading end part of the spigot to the spigot protrusion part. It is therefore possible to reduce a length of a part extending from the opening end part of the socket to an inmost part in the socket. This ultimately allows the pipe joint to be downsized in the pipe axial direction.

BRIEF DESCRIPTION OF DRAWINGS

FIG. 12 is a reference view illustrating an example of a mount failure which may occur when pipes are connected by using the pipe joint.

FIG. 13 is a reference view illustrating another example of a mount failure which may occur when pipes are connected by using the pipe joint.

DESCRIPTION OF EMBODIMENTS

The following description will discuss embodiments of the present invention with reference to drawings.

Embodiment 1

Figure 1:
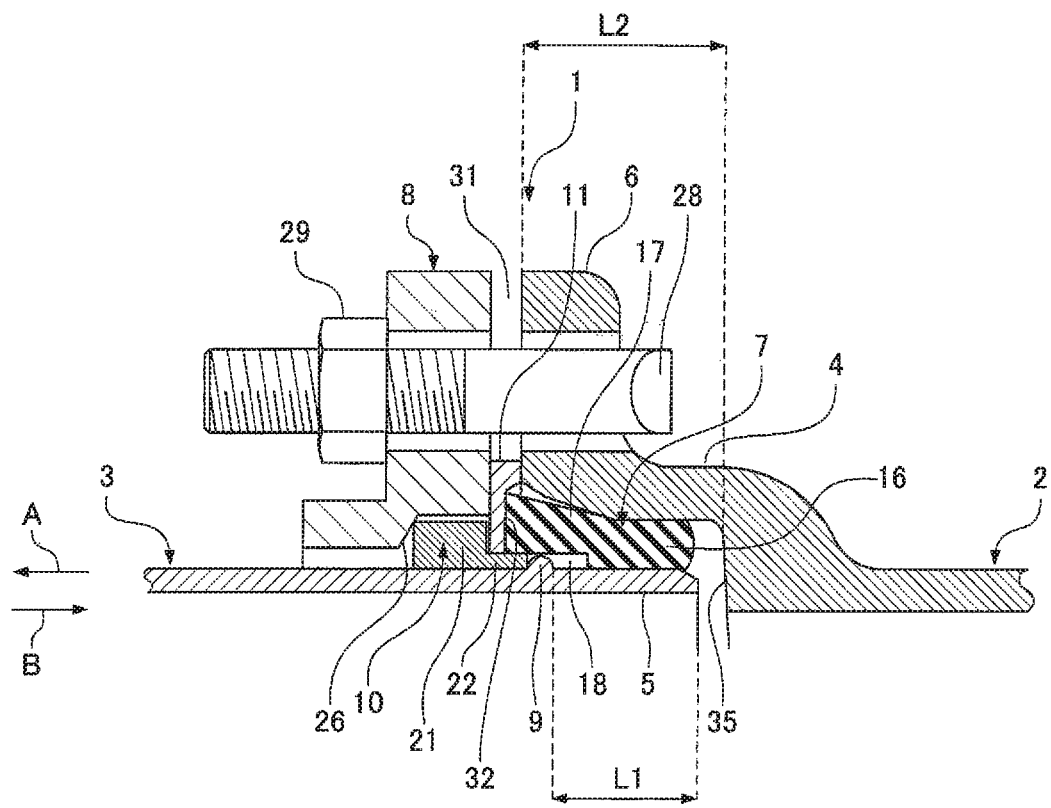
FIG. 1 is a cross-sectional view of a pipe joint in accordance with Embodiment 1 of the present invention.
Figure 2:
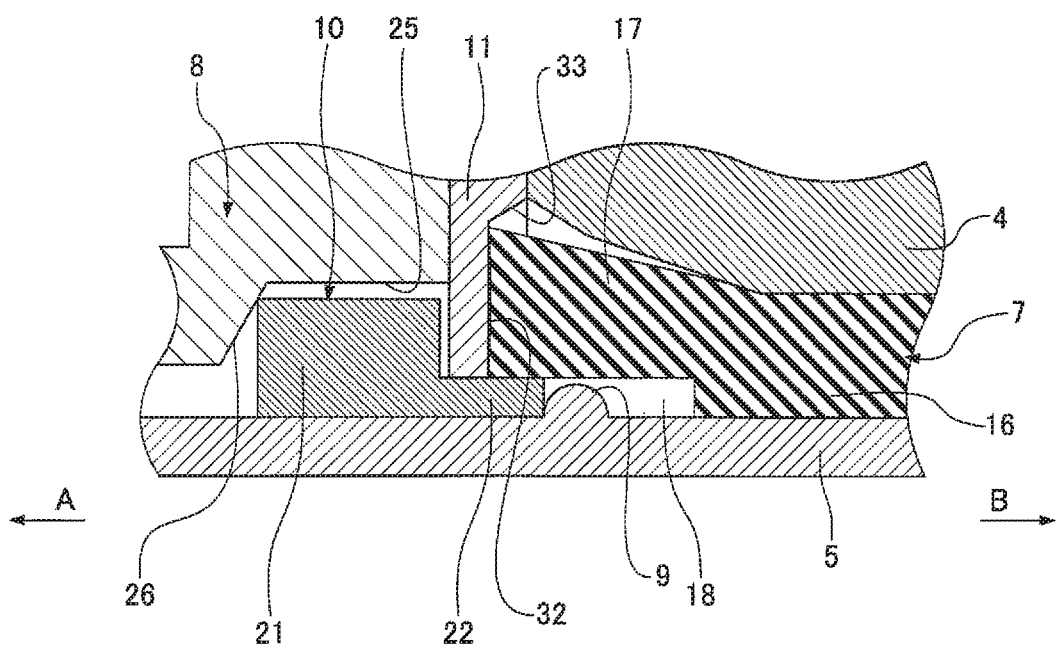
FIG. 2 is a cross-sectional view obtained by enlarging a part of the pipe joint.

A pipe joint 1 in accordance with Embodiment 1 is configured to connect a pipe 2 (deformed pipe or straight pipe) and a pipe 3 (deformed pipe or straight pipe) (see FIGS. 1 and 2). A spigot 5 provided at an end of the pipe 3 is inserted in a socket 4 which is provided at an end of the pipe 2.

An annular sealing member 7 is provided between an outer circumferential surface of the spigot 5 and an inner circumferential surface of the socket 4. A pushing ring 8 for deeply pushing the sealing member 7 into the socket 4 is fitted onto the spigot 5 so as to face an opening end part of the socket 4 from the outside.

The socket 4 has a flange 6 at its opening end part.

The spigot 5 has a spigot protrusion part 9 along its outer circumferential surface. A locking ring 10 (an example of separation preventive member) is provided between an inner circumferential surface of the pushing ring 8 and the outer circumferential surface of the spigot 5. The locking ring 10 engages with the spigot protrusion part 9 in a pipe-axial direction so as to prevent a separation of the spigot 5 from the socket 4. A spacer 11 is provided between the sealing member 7 and the pushing ring 8.

Figure 3:
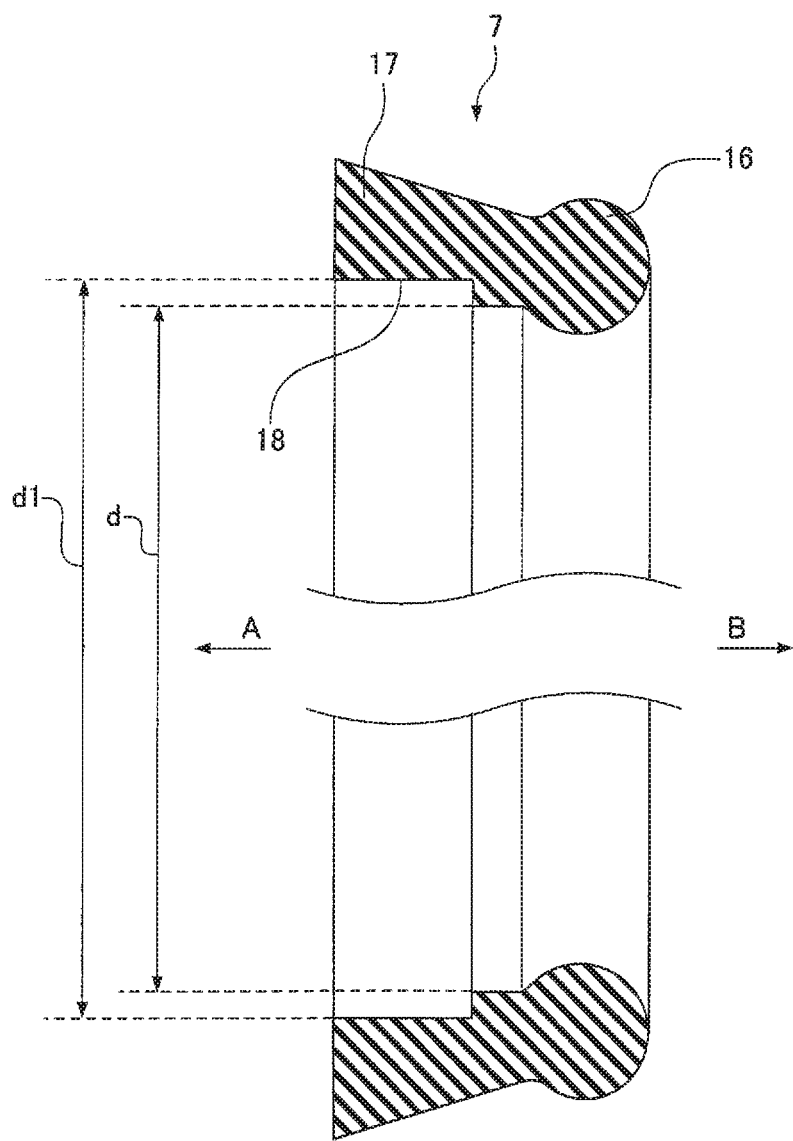
FIG. 3 is a cross-sectional view of a sealing member included in the pipe joint and illustrates a shape of the sealing member in a natural state where the sealing member has not been attached to the pipe joint.

The sealing member 7 is an annular member made of an elastic material, such as a rubber, and is provided along the outer circumferential surface of the spigot protrusion part 9. FIG. 3 is a cross-sectional view illustrating a shape of the sealing member 7 in a natural state where the sealing member 7 has not been attached to the pipe joint 1 yet. The sealing member 7 has a compression part 16 and a base part 17. The compression part 16, whose cross section is circular, is configured to be in first contact with the socket 4 when the sealing member 7 is pressed into the socket 4. The base part 17 is provided so as to extend toward the pushing ring 8. Note that the base part 17 is made of a rubber harder than the compression part 16.

As illustrated in FIGS. 1 and 2, the compression part 16 is located, in the socket 4, upstream of the spigot protrusion part 9 in an insertion direction in which the spigot 5 is inserted. The compression part 16 is sandwiched between the inner circumferential surface of the socket 4 and the outer circumferential surface of the spigot 5 so as to be compressed in a pipe-radial direction.

The base part 17 has a taper shape whose diameter is gradually expanded in a separation direction A of the spigot 5 (i.e., in a direction in which the spigot 5 separates from the socket 4). The base part 17 has, on its inner circumferential surface, a first depressed part 18 in which the spigot protrusion part 9 is inserted in an insertion direction B of the spigot 5 (i.e., in a direction in which the spigot 5 is inserted into the socket 4). When the pipe joint 1 is viewed in the pipe-axial direction, the first depressed part 18 is located upstream of the compression part 16 in the separation direction A of the spigot 5. The first depressed part 18 has an inner diameter d1 greater than an inner diameter d of the base part 17.

As illustrated in FIGS. 1, 2, 4, and 5, the locking ring 10 is an annular member, made of metal, which has a structure whose part is cut out. The locking ring 10 is composed of (i) a ring body part 21 (an example of separation preventive body part) which is fitted between the inner circumferential surface of the pushing ring 8 and the outer circumferential surface of the spigot 5 and (ii) an engaging part 22 which is provided so as to be engageable with the spigot protrusion part 9. The engaging part 22 which protrudes from the ring body part 21 in the insertion direction B of the spigot 5 is inserted between an inner circumferential surface of the first depressed part 18 of the sealing member 7 and the outer circumferential surface of the spigot 5.

A shape of axial section of each of the ring body part 21 and the engaging part 22 is quadrangular. A thickness T1, in the pipe-radial direction, of the engaging part 22 is thinner than a thickness T2, in the pipe-radial direction, of the ring body part 21. Note that (i) the engaging part 22 is equal to the ring body part 21 in inner diameter d7 and (ii) an outer diameter D2 of the engaging part 22 is smaller than an outer diameter D3 of the ring body part 21.

Figure 4:
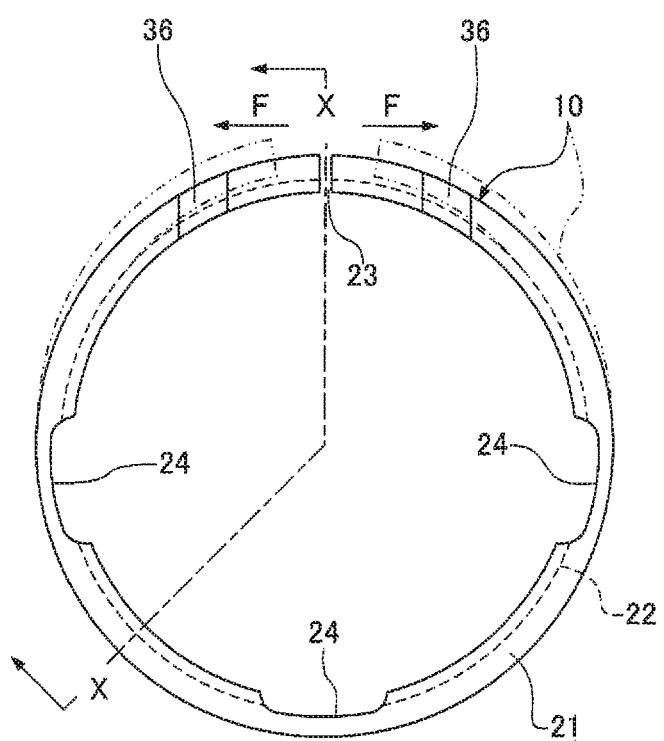
FIG. 4 is a view of a locking ring included in the pipe joint.

Since the locking ring 10 has a structure whose part is cut out, it is possible to expand an inner diameter of the locking ring 10 by applying, with the use of a special diameter-expanding tool, an external force F which allows a cut part 23 of the locking ring 10 to be expanded (see imaginary lines illustrated in FIG. 4). The inner diameter, of the locking ring 10, which has been expanded can be restored by removing the external force F.

The locking ring 10 has grooves 36 with which the diameter-expanding tool is engaged when the inner diameter of the locking ring 10 is being expanded. The locking ring 10 also has a plurality of notches 24 (an example of thickness-reduced part) which facilitate deformation in a diameter-expanding direction.

Note that, when the pipe joint 1 is viewed in the pipe-axial direction, the spigot protrusion part 9 is located between (i) the compression part 16 of the sealing member 7 and (ii) the engaging part 22 of the locking ring 10 (see FIGS. 1 and 2).

Figure 6:
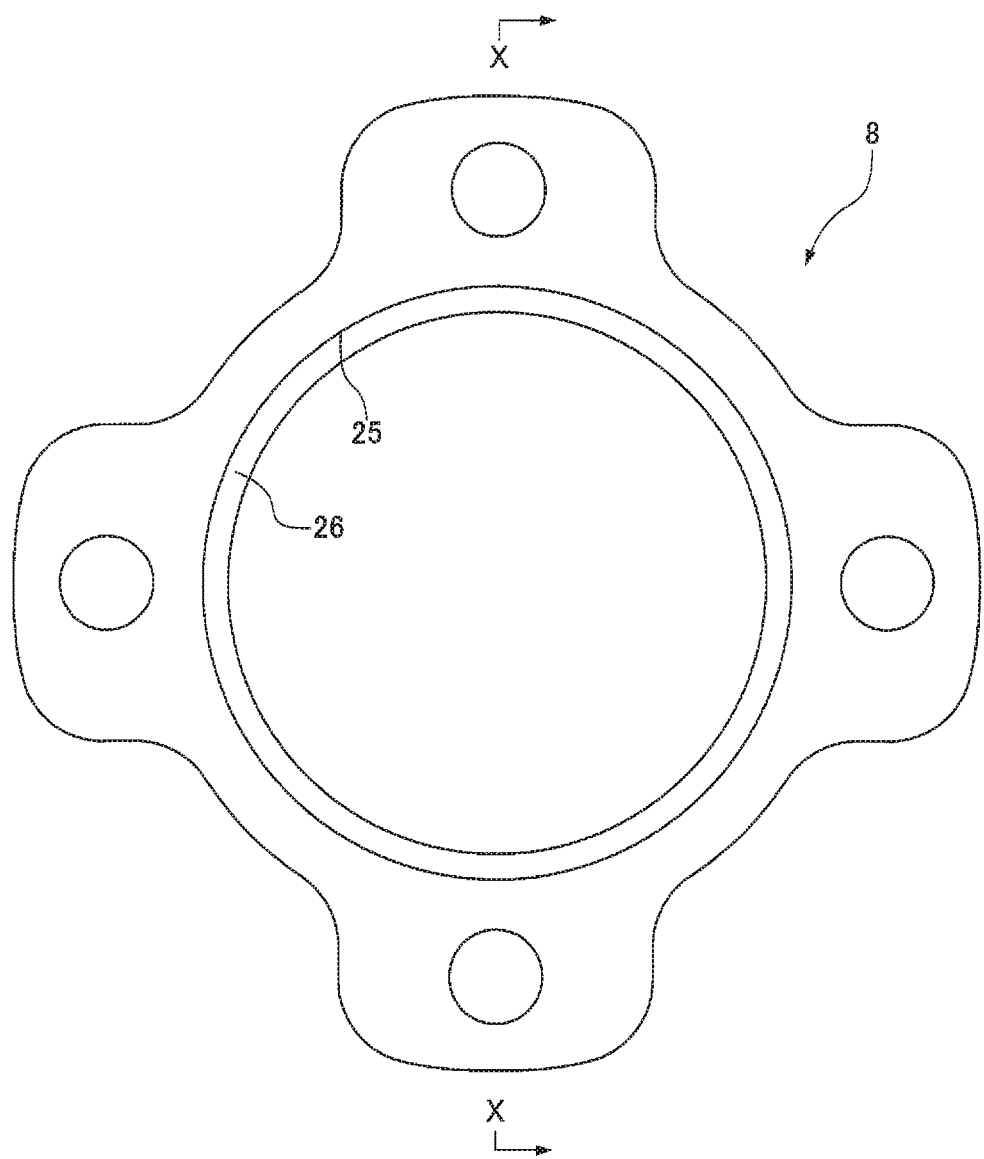
FIG. 6 is a view of a pushing ring included in the pipe joint.
Figure 7:
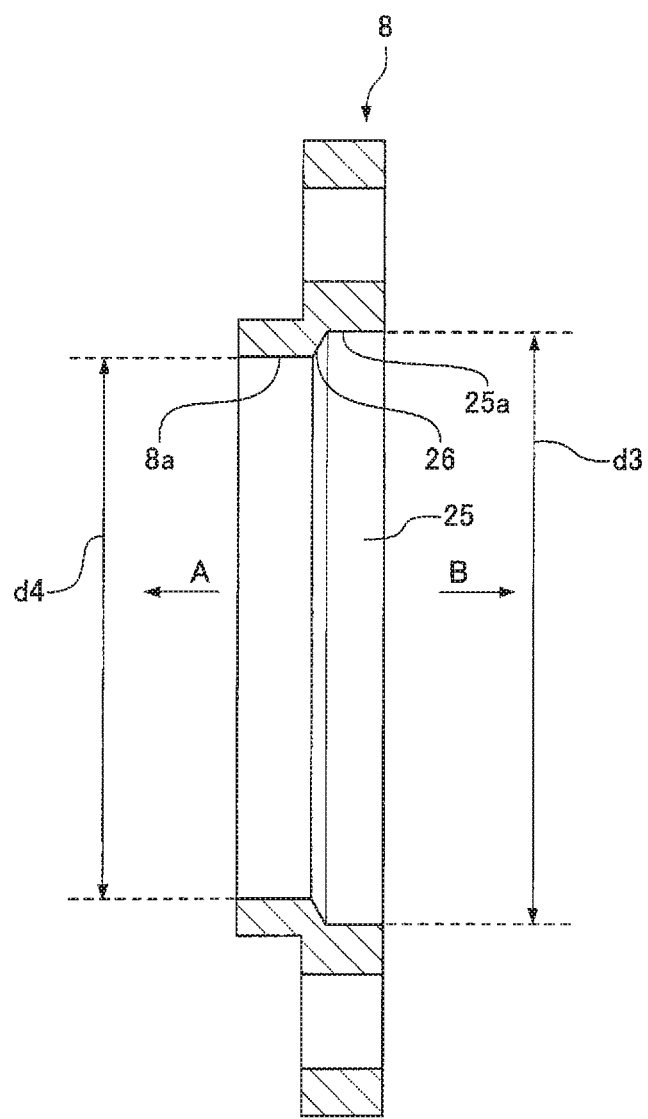
FIG. 7 is a view taken along a line X-X illustrated in FIG. 6.

As illustrated in FIGS. 6 and 7, the pushing ring 8 is an annular member having, at its inner circumferential surface, (i) a fitting part 25 in which the ring body part 21 of the locking ring 10 is fitted and (ii) an inclined surface 26. An inner diameter d3 of the fitting part 25 is greater than an inner diameter d4 of the pushing ring 8. The inclined surface 26 is provided between (i) an inner circumferential surface 8a of the pushing ring 8 and (ii) an inner circumferential surface 25a of the fitting part 25. The inclined surface 26 is inclined so that its diameter is gradually expanded in the insertion direction B of the spigot 5. As illustrated in FIGS. 1 and 2, the inclined surface 26 makes contact with a corner part defined by an end surface of and an outer circumferential surface of the ring body part 21 of the locking ring 10.

As illustrated in FIG. 1, (i) the pushing ring 8 and the flange 6 of the socket 4 are fastened to each other with a plural pairs of bolts 28 and nuts 29, each pair of which forms a T-shape, and (ii) the spacer 11 is sandwiched between the pushing ring 8 and the socket 4. This causes a given gap 31 (proper gap) to be secured between the pushing ring 8 and the flange 6 of the socket 4. The spacer 11 causes the pushing ring 8 to be away from the flange 6 of the socket 4.

Figure 8:
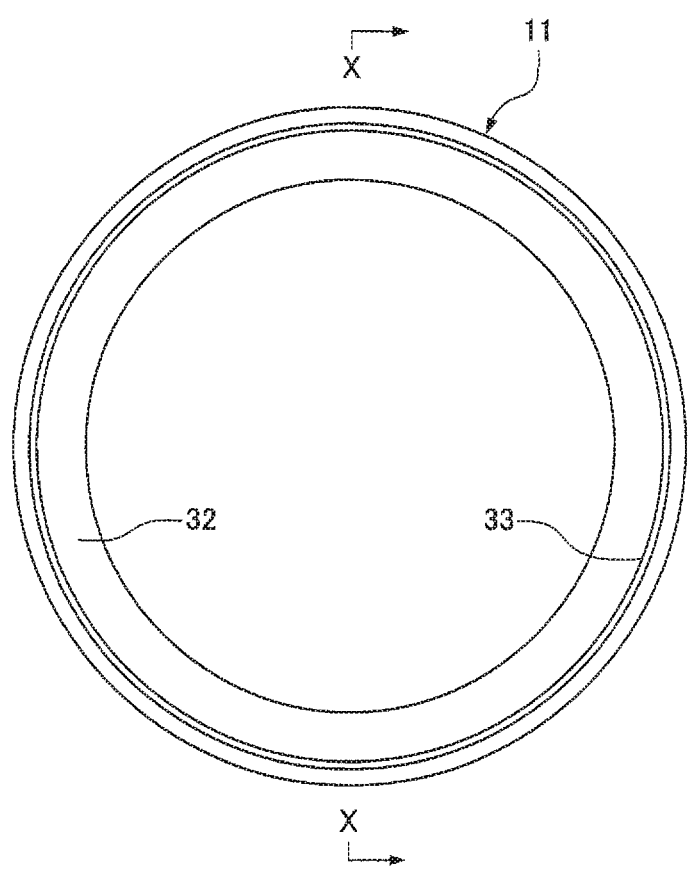
FIG. 8 is a view of a spacer included in the pipe joint.
Figure 9:
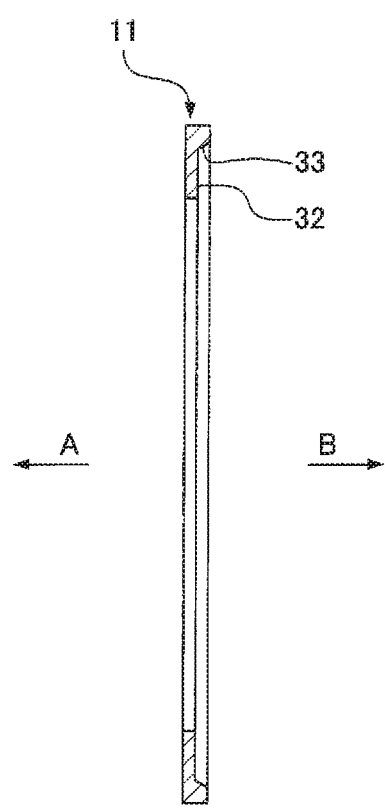
FIG. 9 is a view taken along a line X-X illustrated in FIG. 8.
Figure 10:
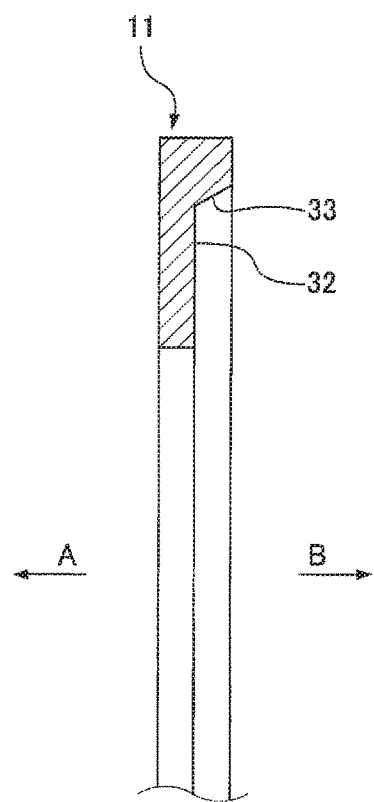
FIG. 10 is a cross-sectional view obtained by enlarging a part of the spacer included in the pipe joint.

The sealing member 7 is deeply pushed into the socket 4 by the pushing ring 8 via the spacer 11. As illustrated in FIGS. 8 through 10, the spacer 11 is an annular member, made of resin, which has a second depressed part 32 on a side which makes contact with the sealing member 7. An outer circumferential surface 33 of the second depressed part 32 is inclined so that its diameter is gradually expanded in the insertion direction B of the spigot 5. As illustrated in FIGS. 1 and 2, an end of the base part 17 of the sealing member 7 is fitted in the second depressed part 32 of the spacer 11.

As illustrated in FIGS. 1 and 2, the engaging part 22 of the locking ring 10 is inserted, through a gap between an inner circumferential surface of the spacer 11 and the outer circumferential surface of the spigot 5, between the inner circumferential surface of the first depressed part 18 of the sealing member 7 and the outer circumferential surface of the spigot 5.

The following description will discuss effects brought about by the above configuration.

As illustrated in FIG. 1, while the pipes 2 and 3 are being connected by using the pipe joint 1, the compression part 16 of the sealing member 7 is sandwiched between the inner circumferential surface of the socket 4 and the outer circumferential surface of the spigot 5 so as to be compressed, in the pipe-radial direction, at a position, in the socket 4, upstream of the spigot protrusion part 9 in the insertion direction B. This causes a gap between the socket 4 and the spigot 5 to be filled up, and ultimately makes it possible to prevent water (an example of fluid) in the pipes 2 and 3 from leaking out from between the socket 4 and the spigot 5.

Furthermore, the sealing member 7 is deeply pushed into the socket 4 by the pushing ring 8 via the spacer 11. This makes it possible to prevent the sealing member 7 from being pushed out of the socket 4 due to, for example, a water pressure (an example of fluid pressure) in the pipes 2 and 3.

Furthermore, the spigot protrusion part 9 engages with the engaging part 22 of the locking ring 10 in the separation direction A. This makes it possible to prevent the separation of the spigot 5 from the socket 4, even in a case where a separation force is caused to act on the spigot 5 due to, for example, earthquakes.

Moreover, the sealing member 7 is provided along the outer circumferential surface of the spigot protrusion part 9. Therefore, the sealing member 7 and the spigot protrusion part 9 overlap each other in the pipe-radial direction. This causes a reduction in length L1 of a part extending from a leading end part of the spigot 5 to the spigot protrusion part 9, and ultimately allows a reduction in length L2 of a part extending from the opening end part of the socket 4 to an inmost part 35 in the socket 4. It is therefore possible to downsize the pipe joint 1 in the pipe-axial direction.

As illustrated in FIGS. 1 and 2, the engaging part 22 of the locking ring 10 is inserted, in the insertion direction B of the spigot 5, between the inner circumferential surface of the first depressed part 18 of the sealing member 7 and the outer circumferential surface of the spigot 5. An end part (i.e., an end which makes contact with the spacer 11) of the sealing member 7 therefore becomes hard to deform inward in the pipe-radial direction. This causes the base part 17 of the sealing member 7 to be stabilized in shape, and ultimately makes it possible to prevent a deterioration in sealing performance (water-tightness) of the sealing member 7.

As illustrated in FIGS. 6 and 7, the pushing ring 8 is an annular member not having a segmentalised configuration. This allows (i) an increase in strength of the pushing ring 8 and (ii) a reduction in production cost.

The following description will discuss a method of connecting the pipes 2 and 3 by using the pipe joint 1.

Figure 20:
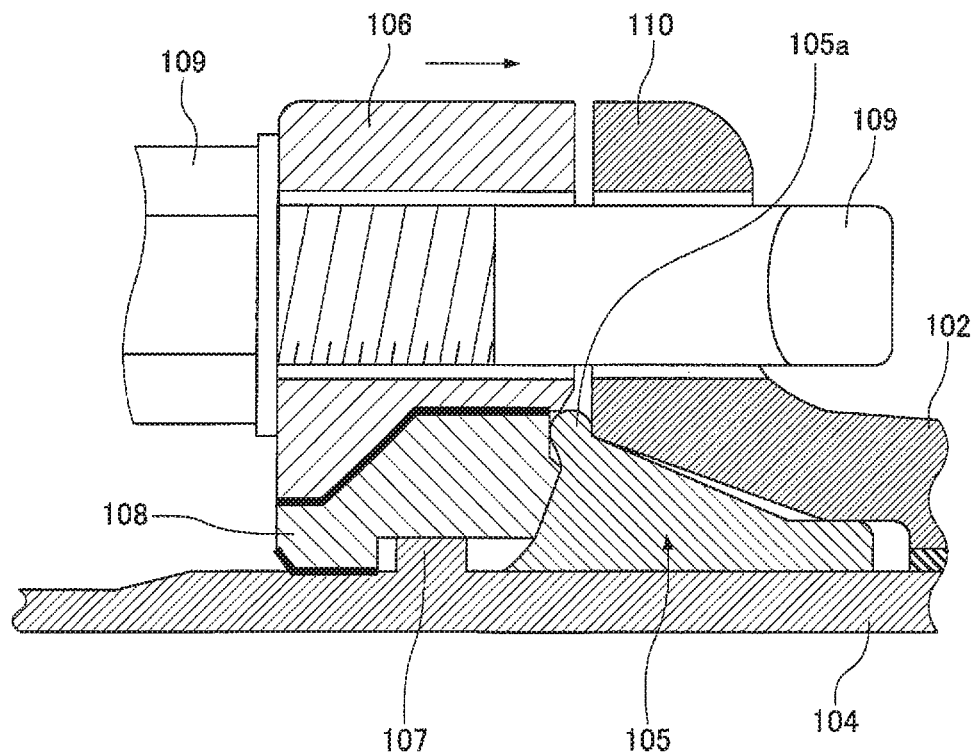
FIG. 20 is a cross-sectional view obtained by enlarging a part of the conventional pipe joint and illustrates a state where a protruding part of a sealing member is caught between a flange of a socket and a locking member.

According to the conventional configuration, while a sealing member 105 is being deeply pushed into a socket 102 by a pushing ring 106 via a locking member 108, it is likely that an end part 105a (an opening end part of the socket 102) of the sealing member 105 is excessively deformed (moved) and protrudes in a diameter-expanding direction. In a case where the end part 105a thus protruded is caught between the opening end part of the socket 102 and the locking member 108 as illustrated in FIG. 20, the locking member 108 cannot sufficiently push the sealing member 105. This causes a problem that a sealing performance of the sealing member 105 deteriorates.

An object of the present invention is to provide a pipe joint and a method, of connecting pipes, each of which can prevent, while a sealing member is being deeply pushed into a socket by a pushing ring via a spacer, an end part of the sealing member from being deformed in a diameter-expanding direction so that the end part of the sealing member will not be caught between the spacer and an opening end part of the socket.

Figure 11:
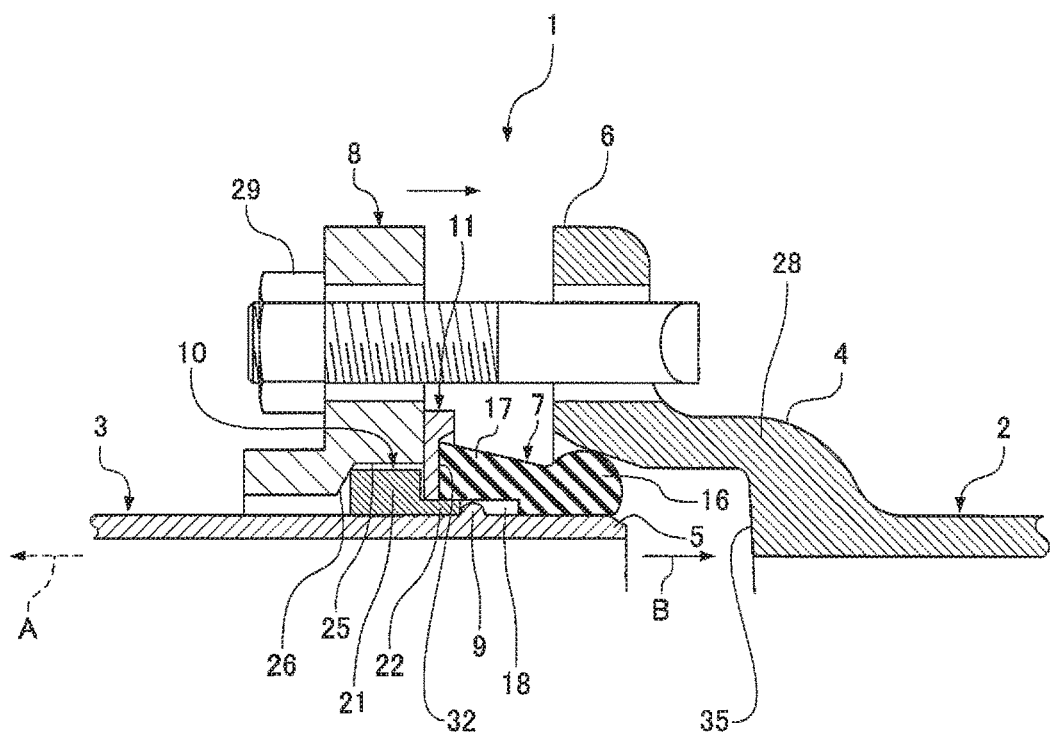
FIG. 11 is a cross-sectional view illustrating a method of connecting pipes by using the pipe joint.

As illustrated in FIG. 11, the pushing ring 8 is fitted onto the spigot 5. The pushing ring 8 is then moved upstream of the spigot protrusion part 9 in the separation direction A of the spigot 5. An external force F is then caused to act on the locking ring 10 with the use of a special diameter-expanding tool as indicated by the imaginary lines in FIG. 4 so that the locking ring 10 has an expanded inner diameter. In this state, the locking ring 10 is fitted onto the spigot 5 and then moved upstream of the spigot protrusion part 9 in the separation direction A. Subsequently, the diameter-expanding tool is removed from the locking ring 10 so that the inner diameter, of the locking ring 10, which has been expanded is shrunk (reduced) as indicated by solid lines in FIG. 4. This causes the locking ring 10 to be fitted onto the spigot 5 so as to be located between the inner circumferential surface of the pushing ring 8 and the outer circumferential surface of the spigot 5 (see FIG. 11), by causing the ring body part 21 of the locking ring 10 to be fitted in the fitting part 25 of the pushing ring 8.

The following description will discuss more specifically how the locking ring 10 is fitted and moved with the use of the special diameter-expanding tool. As indicated by the imaginary lines in FIG. 4, the external force F is first caused to act on the locking ring 10 by engaging the special diameter-expanding tool with the grooves 36 of the locking ring 10. Then, the locking ring 10, whose inner diameter is being expanded, is fitted onto the spigot 5 via a leading end part of the spigot 5. The locking ring 10 is then moved and gets through the spigot protrusion part 9 so as to be located upstream of the spigot protrusion part 9 in the separation direction A.

Figure 5:
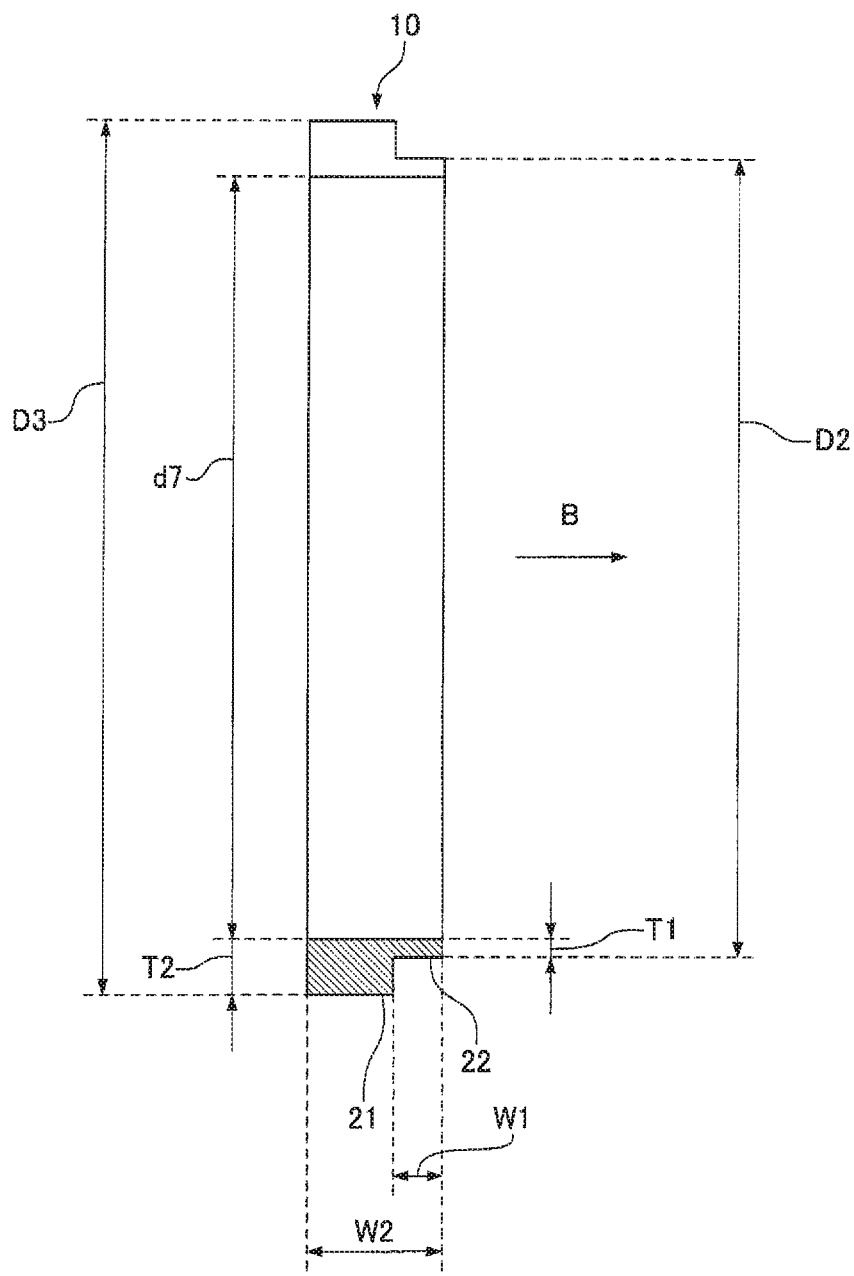
FIG. 5 is a view taken along a line X-X illustrated in FIG. 4.

Since, as illustrated in FIGS. 4 and 5, (i) the thickness T1 of the engaging part 22 is smaller than the thickness T2 of the ring body part 21 and (ii) the locking ring 10 has the plurality of notches 24, the locking ring 10 is prevented from being excessively rigid. This causes a reduction in force F, which is required for expanding the diameter of the locking ring 10 during pipe connection, and ultimately causes a reduction in time and effort for an operation of expanding the diameter of the locking ring 10.

Note that, in order to stabilize an attachment posture of the locking ring 10, it is preferable to expand a width W, in the pipe-axial direction, of the locking ring 10. This also causes a reduction in time and effort for the operation of expanding the diameter of the locking ring 10.

After the locking ring 10 is fixed, an end part of the base part 17 of the sealing member 7 is fitted in the second depressed part 32 of the spacer 11 (see FIG. 11). In this state, the spacer 11 and the sealing member 7 are fitted onto the spigot 5. The spacer 11 is then moved upstream of the spigot protrusion part 9 in the separation direction A of the spigot 5 so that (i) the spacer 11 is fitted onto the engaging part 22 of the locking ring 10 and (ii) the sealing member 7 is provided along the outer circumferential surface of the spigot protrusion part 9. In so doing, it is possible to easily locate the sealing member 7 along the outer circumferential surface of the spigot protrusion part 9 by causing the spigot protrusion part 9 to be inserted in the first depressed part 18 of the sealing member 7.

Note that the compression part 16 of the sealing member 7 is set within a range from the leading end part of the spigot 5 to the spigot protrusion part 9.

After the spacer 11 is fixed, the bolts 28 are fixed with the respective nuts 29 so that the spigot 5 is inserted in the socket 4 while the sealing member 7 is being pushed by the pushing ring 8 via the spacer 11.

As described above, an end part of the sealing member 7 is fitted in the second depressed part 32 of the spacer 11 while the sealing member 7 is being pushed into the socket 4. This makes it possible to prevent the end part of the sealing member 7 from being excessively deformed (moved) in the diameter-expanding direction. As such, while the pipes 2 and 3 are being connected, the end part of the sealing member 7 is prevented from being caught between an end surface of the flange 6 of the socket 4 and the spacer 11. This allows the spacer 11 to sufficiently push the sealing member 7. It is therefore possible to sufficiently realize a sealing performance of the sealing member 7 because the sealing member 7 is surely inserted between the inner circumferential surface of the socket 4 and the outer circumferential surface of the spigot 5 as illustrated in FIGS. 1 and 2.

Furthermore, while the spigot 5 is being inserted in the socket 4, the compression part 16 of the sealing member 7 is set so as to be located within the range from the leading end part of the spigot 5 to the spigot protrusion part 9 as illustrated in FIG. 11. This makes it possible to prevent (i) a mount failure that the compression part 16 is caught between the leading end part of the spigot 5 and the inmost part 35 in the socket 4 (see FIG. 12) and (ii) a mount failure that the sealing member 7 cannot be sufficiently inserted in the socket 4 (see FIG. 13).

The above method causes a reduction in force F which is required for expanding the diameter of the locking ring 10, so that time and effort for the operation of expanding the diameter of the locking ring 10 is alleviated. It is therefore possible to conduct the above operation of connecting the pipes 2 and 3 in a short period of time.

Figure 26:
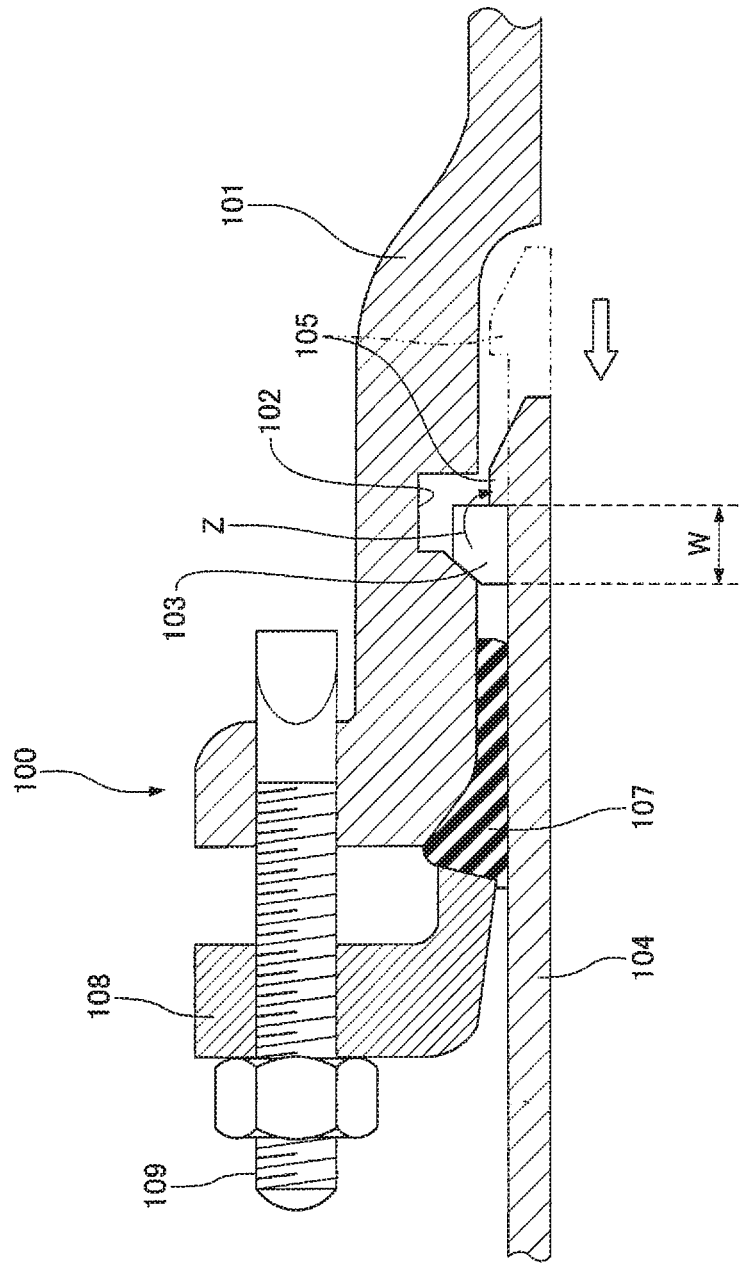
FIG. 26 is a cross-sectional view of a conventional pipe joint.

Examples of a conventional pipe joint include a pipe joint 100 illustrated in FIG. 26. According to the pipe joint 100, (i) a locking ring 103 is located in a circumferential groove 102 which is provided in a socket 101 and (ii) a spigot protrusion part 105 is provided on a spigot 104. The spigot protrusion part 105 engages with the locking ring 103 so as to prevent a separation of the spigot 104 from the socket 101.

Figure 27:
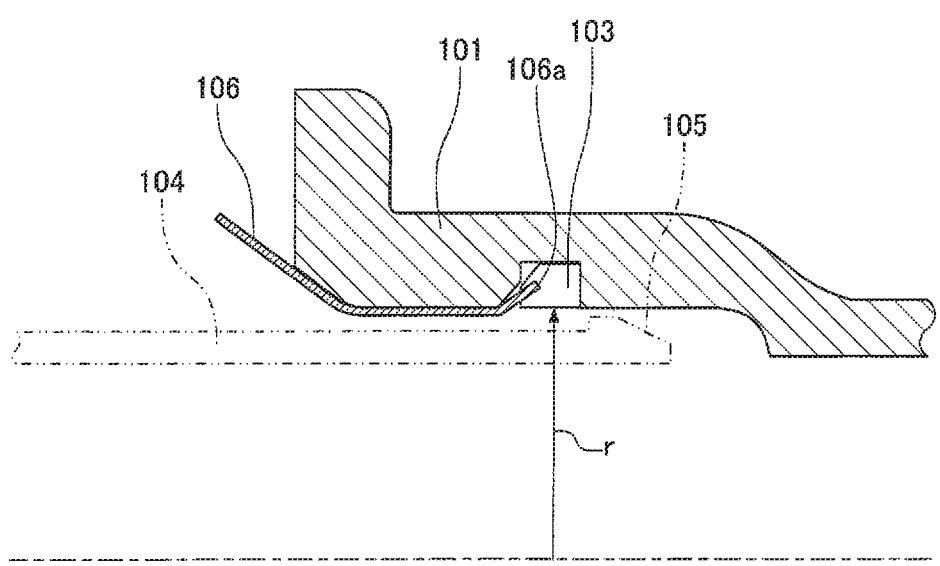
FIG. 27 is a cross-sectional view illustrating how to connect pipes by using the pipe joint.

The locking ring 103 is an annular member having a structure whose part is cut out. The following operation is conducted so that the locking ring 103 does not disturb the spigot 104 which is being inserted into the socket 101 during pipe connection. As illustrated in FIG. 27, a diameter-expanding tool 106 is inserted in the socket 101 via an opening end part so as to be along an inner circumferential surface of the socket 101. A tip 106a of the diameter-expanding tool 106 is then inserted in a cut of the locking ring 103 so as to expand a diameter r of the locking ring 103. Subsequently, the locking ring 103 is fitted in the circumferential groove 102 of the socket 101. The locking ring 103 is then moved and gets through the spigot protrusion part 105.

After the locking ring 103 gets through the spigot protrusion part 105, the diameter-expanding tool 106 is removed from the locking ring 103 so that the diameter r, of the locking ring 103, which has been expanded is shrunk. This causes the locking ring 103 to be fitted onto an outer circumferential surface of the spigot 104 as illustrated in FIG. 26. Note that in FIG. 26, a reference numeral 107 indicates a sealing rubber ring, a reference numeral 108 indicates a pushing ring, and a reference numeral 109 indicates a fixing bolt.

According to the above configuration, when the spigot 104 is about to come off of the socket 101, (i) the spigot protrusion part 105 engages with the locking ring 103 and (ii) the locking ring 103 then engages with an inner circumferential surface of the circumferential groove 102 as illustrated in FIG. 26. This prevents the separation of_the spigot 104 from the socket 101.

In the above case, the locking ring 103 receives a force which causes the locking ring 103 to twist and bend in a radially-outward direction Z. Because of this, it is likely that an attachment posture of the locking ring 103 becomes unstable. In order to stabilize the attachment posture of the locking ring 103, it is preferable to expand a width W, in the pipe-axial direction, of the locking ring 103.

Note that such a pipe joint 100 is disclosed in, for example, Patent Literature 2.

In the above configuration, an increase in width W causes the locking ring 103 to be excessively rigid. It follows that, while the spigot 104 is being inserted, during pipe connection, in the socket 101 as illustrated in FIG. 27, a large force will be required for expanding the diameter r of the locking ring 103 with the use of the diameter-expanding tool 106. This causes an increase in time and effort for an operation of expanding the diameter of the locking ring 103, and ultimately causes a problem that an operation of pipe connection takes long.

An object of the present invention is to provide a pipe joint and a separation preventive member each of which makes it possible to conduct an operation of pipe connection in a short period of time.

As illustrated in FIG. 1, while the pipes 2 and 3 are being connected by using the pipe joint 1, the compression part 16 of the sealing member 7 is sandwiched between the inner circumferential surface of the socket 4 and the outer circumferential surface of the spigot 5 so as to be compressed, in the pipe-radial direction, at a position, in the socket 4, upstream of the spigot protrusion part 9 in the insertion direction B. This causes a gap between the socket 4 and the spigot 5 to be filled up, and ultimately makes it possible to prevent water (an example of fluid) in the pipes 2 and 3 from leaking out from between the socket 4 and the spigot 5.

Furthermore, the sealing member 7 is deeply pushed into the socket 4 by the pushing ring 8 via the spacer 11. This makes it possible to prevent the sealing member 7 from being pushed out of the socket 4 due to, for example, a water pressure (an example of fluid pressure) in the pipes 2 and 3.

Furthermore, the spigot protrusion part 9 engages with the engaging part 22 of the locking ring 10 in the separation direction A. This makes it possible to prevent the separation of_the spigot 5 from the socket 4, even in a case where a separation force is caused to act on the spigot 5 due to, for example, earthquakes.

Note that, in order to stabilize the attachment posture of the locking ring 10, it is preferable to expand an entire width W2, in the pipe-axial direction, of the locking ring 10 (see FIG. 5). Even in such a case, it is still possible to conduct the operation of connecting the pipes 2 and 3 in a short period of time because the time and effort for the operation of expanding the diameter of the locking ring 10 is reduced as discussed above.

Moreover, the sealing member 7 is provided along the outer circumferential surface of the spigot protrusion part 9. Therefore, the sealing member 7 and the spigot protrusion part 9 overlap each other in the pipe-radial direction. This allows a reduction in length L1 of a part extending from a leading end part of the spigot 5 to the spigot protrusion part 9, and ultimately allows a reduction in length L2 of a part extending from the opening end part of the socket 4 to an inmost part 35 in the socket 4. It is therefore possible to downsize the pipe joint 1 in the pipe-axial direction.

As illustrated in FIGS. 1 and 2, the engaging part 22 of the locking ring 10 is inserted, in the insertion direction B of the spigot 5, between the inner circumferential surface of the first depressed part 18 of the sealing member 7 and the outer circumferential surface of the spigot 5. An end part (i.e., an end part which makes contact with the spacer 11) of the sealing member 7 therefore becomes hard to deform inward in the pipe-radial direction. This causes the base part 17 of the sealing member 7 to be stabilized in shape, and ultimately makes it possible to prevent a deterioration in sealing performance (water-tightness) of the sealing member 7.

As illustrated in FIGS. 6 and 7, the pushing ring 8 is an annular member not having a segmentalised configuration. This allows (i) an increase in strength of the pushing ring 8 and (ii) a reduction in production cost.

As illustrated in FIG. 5, it is preferable to configure the locking ring 10 such that the thickness T1 of the engaging part 22 is set to be not smaller than ⅕ times and not greater than ½ times the thickness T2 of the ring body part 21. The thickness T1 which is set to be not smaller than ⅕ times the thickness T2 makes it possible to secure strength of the engaging part 22, whereas the thickness T1 which is set to be not greater than ½ times the thickness T2 makes it possible to reduce the force F which is required for expanding the diameter of the locking ring 10 during pipe connection.

Furthermore, it is preferable to set the width W1, in the pipe-axial direction, of the engaging part 22 to be not smaller than ⅕ times and not greater than ½ times the entire width W2 of the locking ring 10. By setting the width W1 to be not smaller than ⅕ times the entire width W2, it becomes possible to reduce the force F which is required for expanding the diameter of the locking ring 10 during pipe connection. By setting the width W1 to be not greater than ½ times the whole width W2, it becomes possible to secure strength of the engaging part 22.

Embodiment 2

The following description will discuss Embodiment 2 of the present invention. Note that identical reference numerals are given to members identical to those of Embodiment 1, and thus detailed descriptions of such members are omitted.

Figure 14:
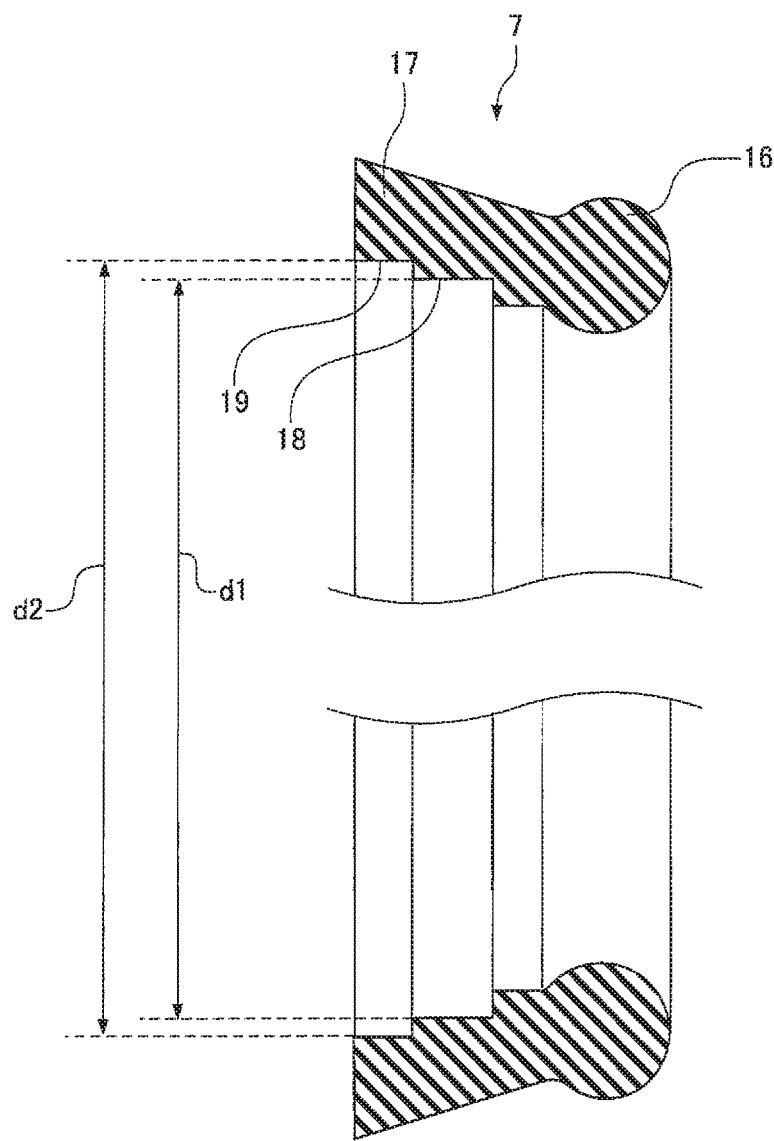
FIG. 14 is a cross-sectional view of a sealing member included in a pipe joint in accordance with each of Embodiments 2 and 3 of the present invention and illustrates a shape of the sealing member in a natural state where the sealing member has not been attached to the pipe joint.

As illustrated in FIG. 14, a first depressed part 18 of a sealing member 7 has, over its entire periphery, a stepped part 19 which is provided between an inner circumferential surface of the first depressed part 18 and an end surface of a base part 17. The stepped part 19 has an inner diameter d2 greater than an inner diameter d1 of the first depressed part 18.

Figure 15:
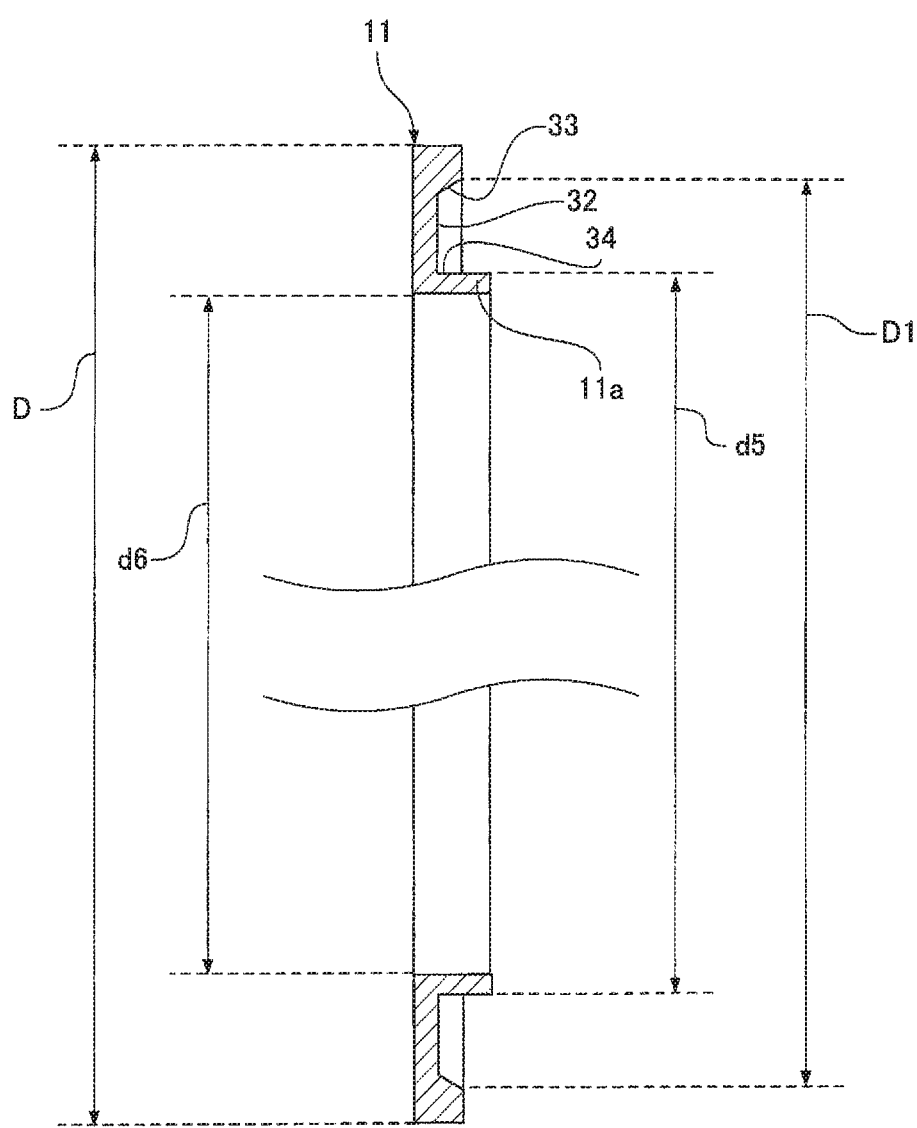
FIG. 15 is a cross-sectional view of a spacer included in the pipe joint.

As illustrated in FIG. 15, a second depressed part 32 of a spacer 11 has an outer circumferential surface 33 and an inner circumferential surface 34 which face each other in a radial direction. The second depressed part 32 has (i) an inner diameter d5 greater than an inner diameter d6 of the spacer 11 and (ii) an outer diameter D1 smaller than that of an outer diameter D of the spacer 11.

Figure 16:
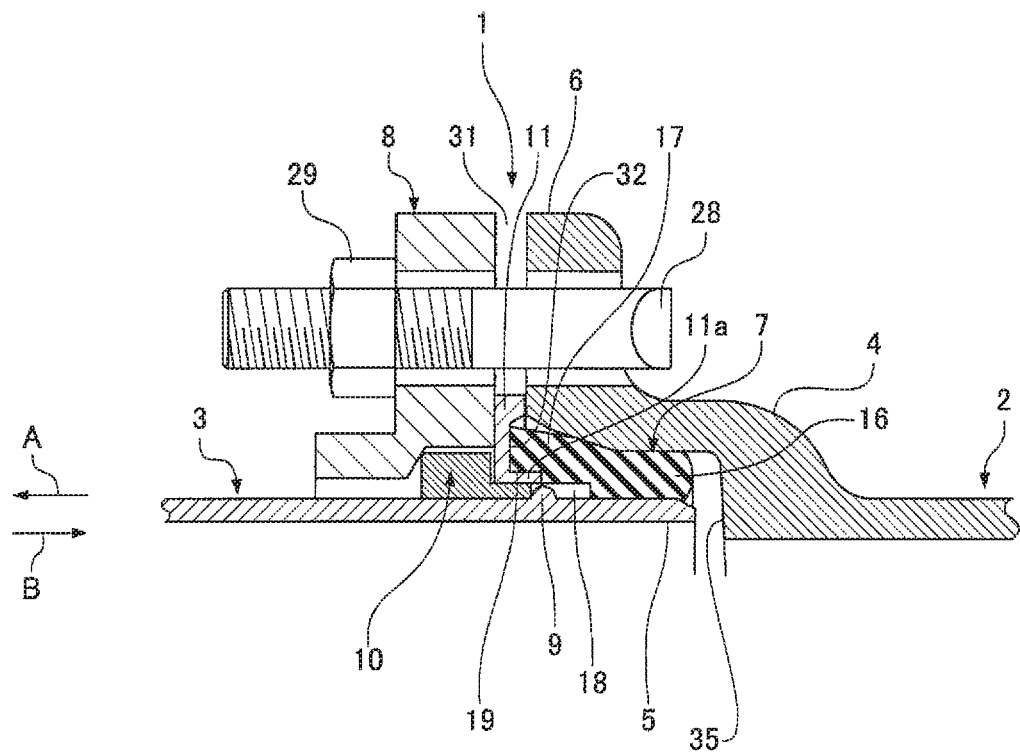
FIG. 16 is a cross-sectional view of the pipe joint.
Figure 17:
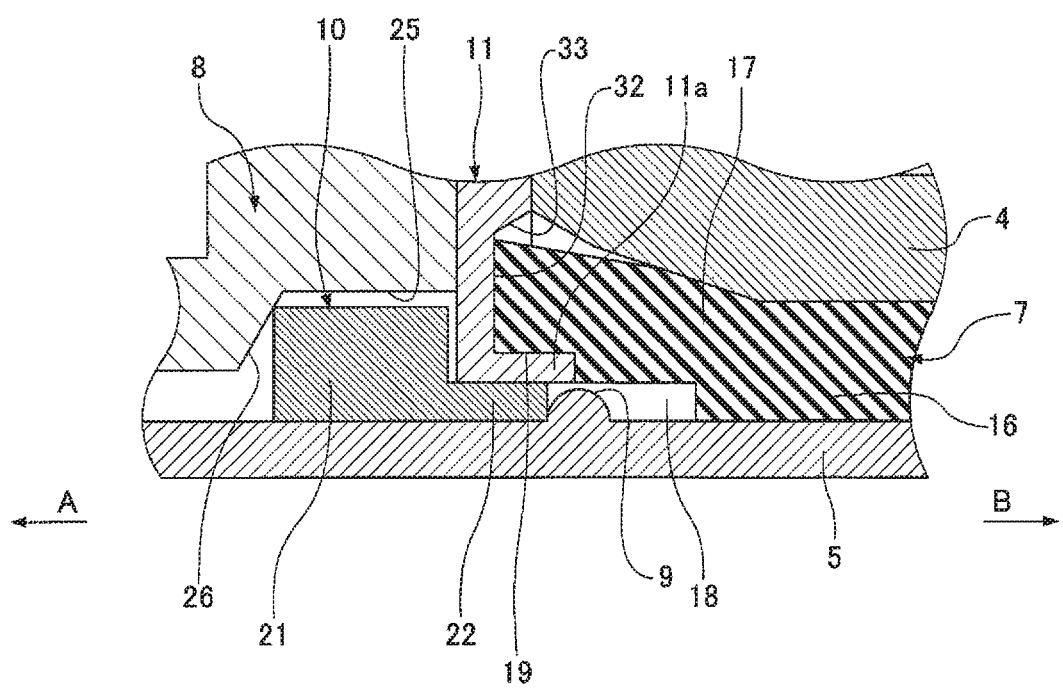
FIG. 17 is a cross-sectional view obtained by enlarging a part of the pipe joint.

As illustrated in FIGS. 16 and 17, an end part of the base part 17 of the sealing member 7 is fitted in the second depressed part 32 of the spacer 11. In so doing, an inner circumferential edge 11a of the spacer 11 is fitted in the stepped part 19 of the base part 17 of the sealing member 7.

Figure 18:
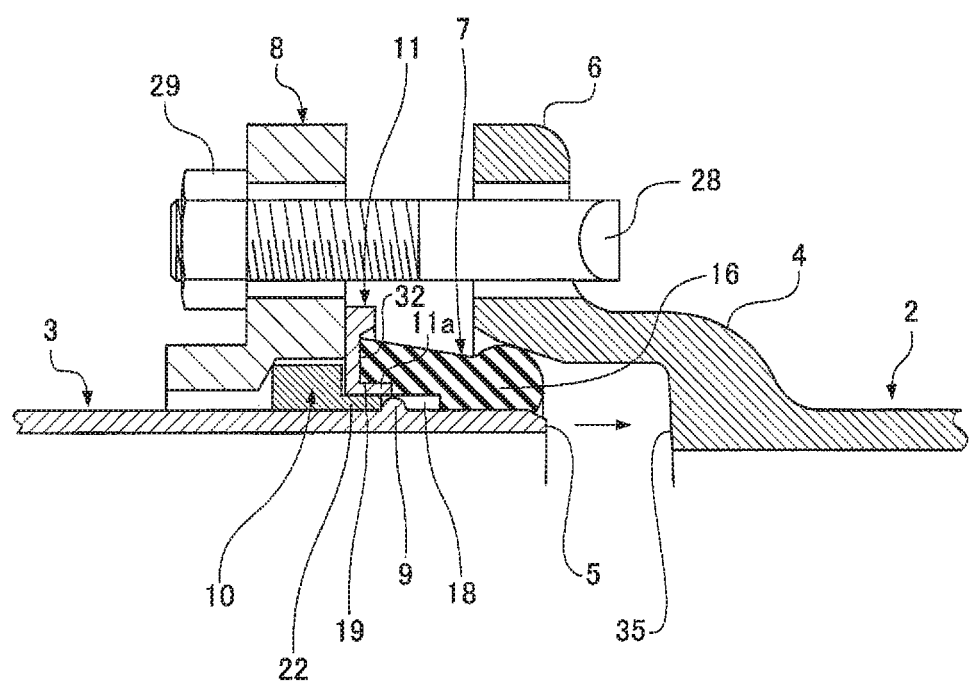
FIG. 18 is a cross-sectional view illustrating a method of connecting pipes by using the pipe joint.
Figure 19:
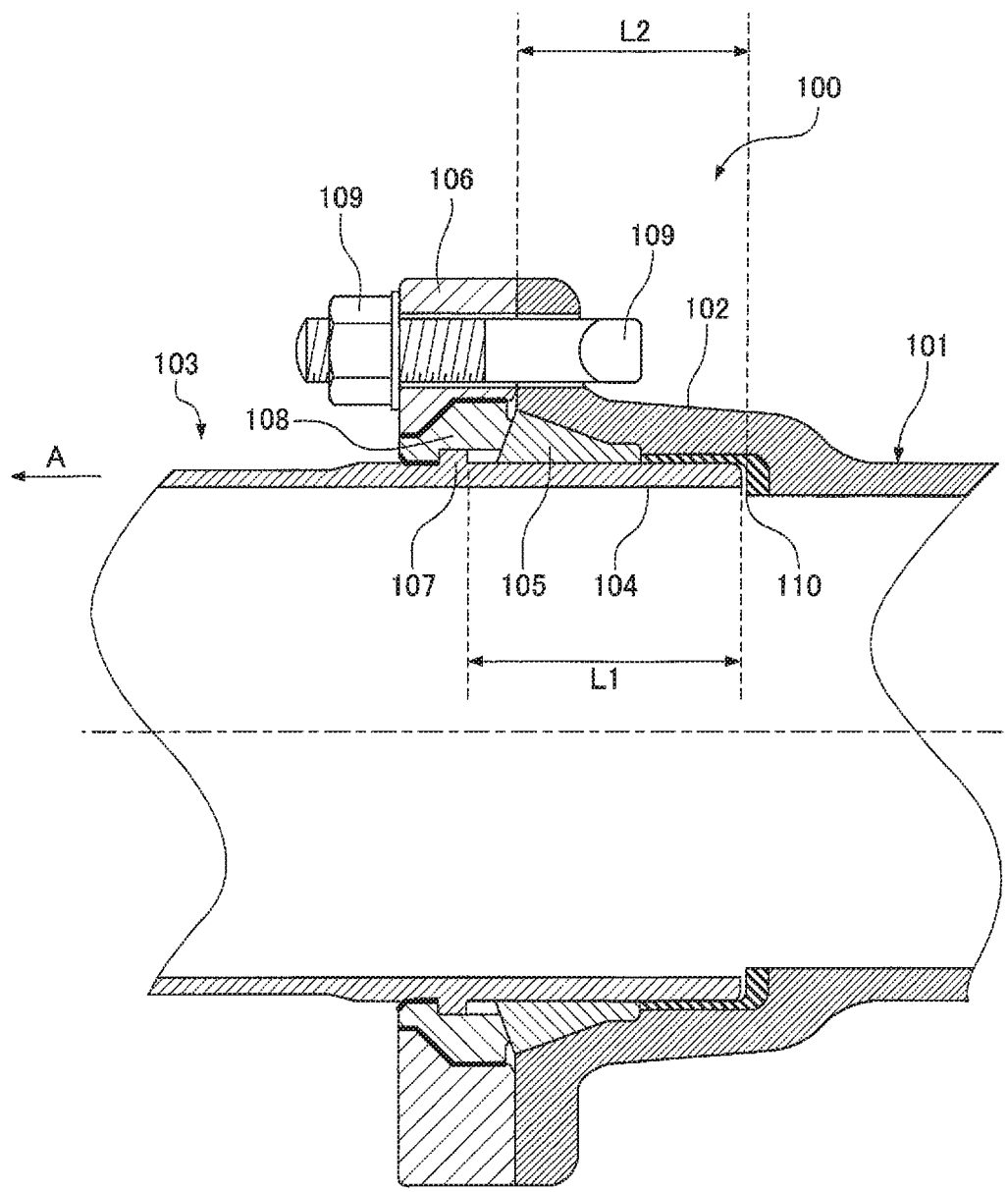
FIG. 19 is a cross-sectional view of a conventional pipe joint.

According to the above configuration, an end part of the sealing member 7 is fitted in the second depressed part 32 of the spacer 11 while the sealing member 7 is being pressed into a socket 4 as illustrated in FIG. 18. This makes it possible to prevent the end part of the sealing member 7 from being excessively deformed (moved) in a pipe-radial direction (diameter-expanding direction and diameter-reducing direction). As such, while first and second pipes 2 and 3 are being connected, the end part of the sealing member 7 is prevented from being caught between an end surface of a flange 6 of the socket 4 and the spacer 11. This allows the spacer 11 to sufficiently push the sealing member 7. It is therefore possible to sufficiently realize a sealing performance of the sealing member 7 by securely inserting the sealing member 7 between an inner circumferential surface of the socket 4 and an outer circumferential surface a spigot 5 as illustrated in FIGS. 16 and 17.

Figure 21:
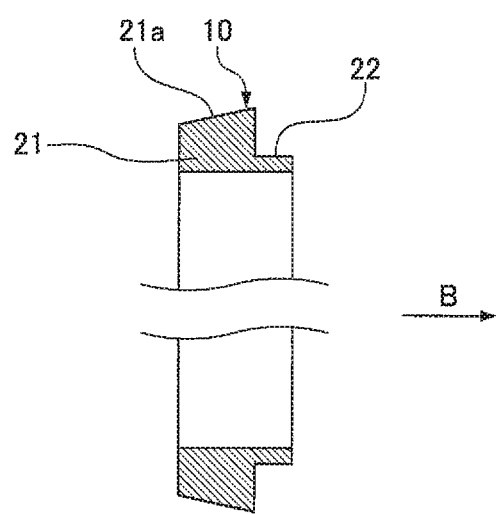
FIG. 21 is a cross-sectional view of a locking ring included in the pipe joint in accordance with Embodiment 2 of the present invention.
Figure 22:
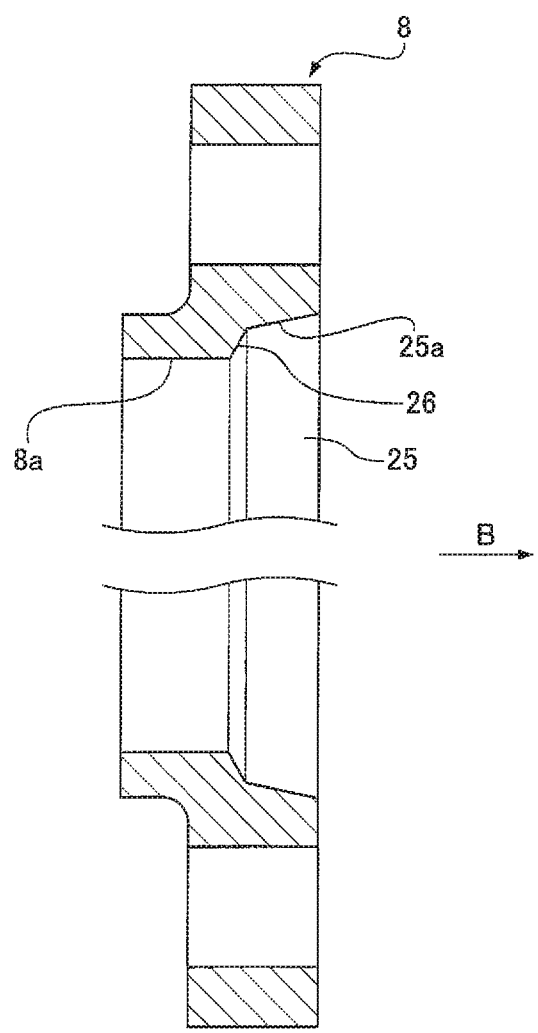
FIG. 22 is a cross-sectional view of a pushing ring included in the pipe joint.
Figure 23:
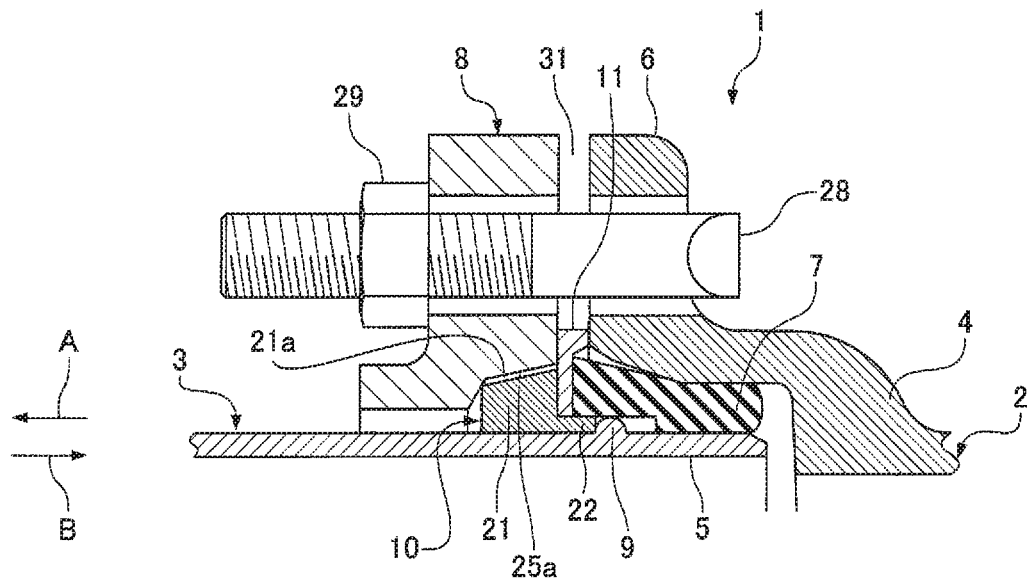
FIG. 23 is a cross-sectional view of the pipe joint and illustrates a state where the locking ring is set in a normal orientation.

As illustrated in FIGS. 21 through 23, a ring body part 21 of the locking ring 10 has an outer circumferential surface 21a whose diameter is gradually expanded in an insertion direction B of the spigot 5. Similarly, a fitting part 25 of a pushing ring 8 has an inner circumferential surface 25a whose diameter is gradually expanded in the insertion direction B of the spigot 5.

The following description will discuss effects brought about by the above configuration.

If an engaging part 22 of the locking ring 10 is set in a normal orientation in a pipe-axial direction as illustrated in FIG. 23, then (i) the ring body part 21 of the locking ring 10 is fitted in the fitting part 25 of the pushing ring 8 and (ii) a gap between the pushing ring 8 and the flange 6 of the socket 4 is set to a given gap 31.

Figure 24:
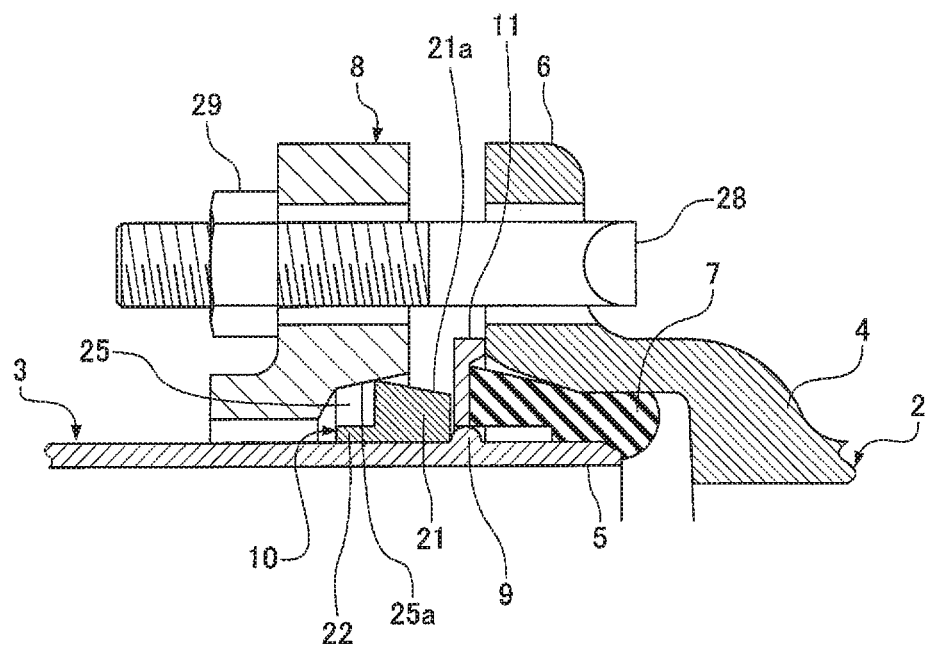
FIG. 24 is a cross-sectional view of the pipe joint and illustrates a state where the locking ring is set in an orientation reverse to the normal orientation.

In contrast, if the engaging part 22 is set in an orientation, reverse to the normal orientation, in the pipe-axial direction as illustrated in FIG. 24, then (i) the ring body part 21 of the locking ring 10 cannot be fitted in the fitting part 25 of the pushing ring 8 and (ii) a gap between the pushing ring 8 and the flange 6 of the socket 4 is set to be greater than the given gap 31. This allows a worker to immediately recognize that the locking ring 10 is reversely attached, so that the worker can correct the locking ring 10 in the normal orientation.

Embodiment 3

The following description will discuss Embodiment 3 of the present invention with reference to FIG. 14 through FIG. 18. Note that identical reference numerals are given to members identical to those of Embodiment 1, and thus detailed descriptions of such members are omitted.

As illustrated in FIG. 14, a first depressed part 18 of a sealing member 7 has, over its entire periphery, a stepped part 19 which is provided between an inner circumferential surface of the first depressed part 18 and an end surface of a base part 17. The stepped part 19 has an inner diameter d2 greater than an inner diameter d1 of the first depressed part 18.

As illustrated in FIG. 15, a second depressed part 32 of a spacer 11 has an outer circumferential surface 33 and an inner circumferential surface 34 which face each other in a radial direction. The second depressed part 32 has (i) an inner diameter d5 greater than an inner diameter d6 of the spacer 11 and (ii) an outer diameter D1 smaller than that of an outer diameter D of the spacer 11.

As illustrated in FIGS. 16 and 17, an end part of the base part 17 of the sealing member 7 is fitted in the second depressed part 32 of the spacer 11. In so doing, an inner circumferential edge 11a of the spacer 11 is fitted in the stepped part 19 of the base part 17 of the sealing member 7.

According to the above configuration, an end part of the sealing member 7 is fitted in the second depressed part 32 of the spacer 11 while the sealing member 7 is being pressed into a socket 4 as illustrated in FIG. 18. This makes it possible to prevent the end part of the sealing member 7 from being excessively deformed (moved) in a pipe-radial direction (diameter-expanding direction and diameter-reducing direction). As such, while first and second pipes 2 and 3 are being connected, the end part of the sealing member 7 is prevented from being caught between an end surface of a flange 6 of the socket 4 and the spacer 11. This allows the spacer 11 to sufficiently push the sealing member 7. It is therefore possible to favorably realize a sealing performance of the sealing member 7 by securely inserting the sealing member 7 between an inner circumferential surface of the socket 4 and an outer circumferential surface a spigot 5 as illustrated in FIGS. 16 and 17.

Embodiment 4

Figure 25:
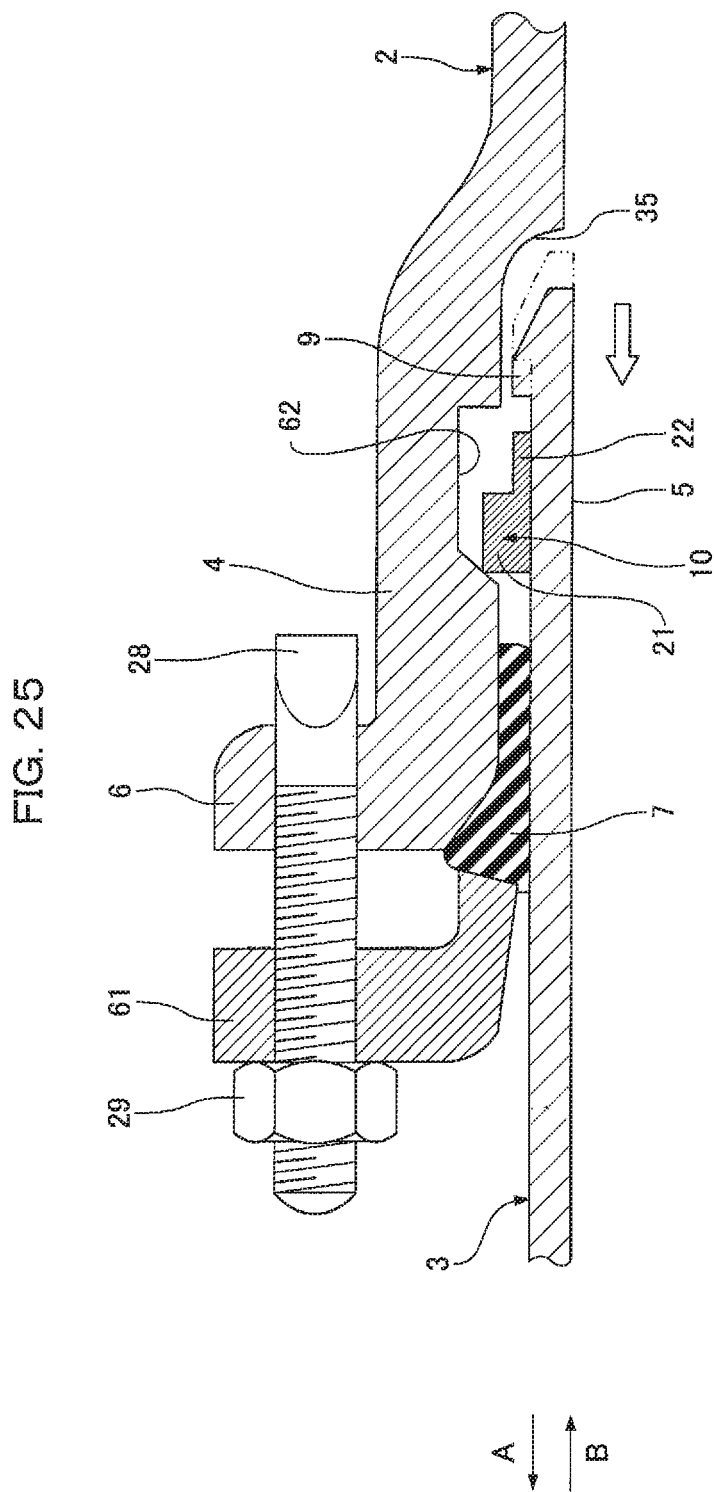
FIG. 25 is a cross-sectional view of a pipe joint in accordance with Embodiment 4 of the present invention.

The following description will discuss Embodiment 4 of the present invention with reference to FIG. 25. Note that identical reference numerals are given to members identical to those of Embodiment 1, and thus detailed descriptions of such members are omitted.

As illustrated in FIG. 25, (i) an annular sealing member 7 is provided between an outer circumferential surface of a spigot 5 and an inner circumferential surface of a socket 4 and (ii) a pushing ring 61 directly pushes the sealing member 7 so that the sealing member 7 is deeply pushed into the socket 4.

A groove 62 is provided on the inner circumferential surface, in an inmost part, of the socket 4 over an entire periphery of the socket 4. A locking ring 10 for preventing the separation of the spigot 5 from the socket 4 is fitted onto the spigot 5 and is fitted in the groove 62.

With the above configuration, a spigot protrusion part 9 engages with an engaging part 22 of the locking ring 10 in a separation direction A. As such, it is possible to prevent the separation of the spigot 5 from the socket 4 even in a case where a separation force is caused to act on the spigot 5 due to, for example, earthquakes.

In Embodiment 4, a depth, of the groove 62, from an opening end part of an inner circumferential surface to a bottom surface is kept constant as illustrated in FIG. 25. However, the present invention is not limited as such. Alternatively, the groove 62 can have two-stage different depths which match respective of a ring body part 21 and the engaging part 22, of the locking ring 10, which have different thicknesses.

Note that the locking ring 10 in each of Embodiments 1 through 4 has a plurality of notches 24 (thickness-reduced parts). However, the present invention is not limited as such. Alternatively, the plurality of notches 24 can be omitted.

Furthermore, the spacer 11 in each of Embodiments 1 through 4 is sandwiched between the pushing ring 8 and the socket 4 as illustrated in FIG. 1. This causes the given gap 31 to be secured between the pushing ring 8 and the flange 6 of the socket 4 so that the pushing ring 8 and the flange 6 of the socket 4 are away from each other via the spacer 11. However, the present invention is not limited as such. Alternatively, the pushing ring 8 can be brought into direct contact with the flange 6 of the socket 4, instead of providing the spacer 11. Alternatively, the present invention can be configured such that (i) one of the pushing ring 8 and the flange 6 of the socket 4 has a protrusion part and (ii) the protrusion part makes contact with the other of the pushing ring 8 and the flange 6 of the socket 4.

Embodiments 1 through 4 are mere examples of embodiments of the present invention. As such, the scope of the present invention is not limited to such embodiments. The present invention can be altered by a skilled person as appropriate within the scope in which the effects of the present invention can be brought about.

(Supplemental Notes) The present invention can also be rephrased as below.

A pipe joint in accordance with an aspect of the present invention is a pipe joint for connecting a first pipe and a second pipe, the first pipe having a socket, the second pipe having a spigot, the spigot being inserted in the socket, the spigot having a spigot protrusion part along its outer circumferential surface, the pipe joint including: a sealing member, having an annular shape, which is provided between an outer circumferential surface of the spigot and an inner circumferential surface of the socket; a pushing ring configured to deeply push the sealing member into the socket, the pushing ring being fitted onto the spigot so as to face an opening end part of the socket from the outside; and a separation preventive member configured to engage with the spigot protrusion part in a pipe-axial direction so as to prevent a separation of the spigot from the socket, the separation preventive member being provided between an inner circumferential surface of the pushing ring and the outer circumferential surface of the spigot, the sealing member being provided along an outer circumferential surface of the spigot protrusion part and having a compression part sandwiched between the outer circumferential surface of the spigot and the inner circumferential surface of the socket, the compression part being compressed in a pipe-radial direction, the compression part being located, in the socket, upstream of the spigot protrusion part in an insertion direction in which the spigot is inserted.

According to the above configuration, the sealing member is provided along the outer circumferential surface of the spigot protrusion part while the pipes are being connected with use of the pipe joint. This allows the sealing member and the spigot protrusion part to overlap each other in the pipe-radial direction, and ultimately allows a reduction in length of a part extending from a leading end part of the spigot to the spigot protrusion part. It is therefore possible to reduce a length of a part extending from the opening end part of the socket to an inmost part in the socket. This ultimately allows the pipe joint to be downsized in the pipe axial direction.

A pipe joint in accordance with an aspect of the present invention is configured such that the sealing member has, on its inner circumferential surface, a first depressed part in which the spigot protrusion part is inserted in the insertion direction; and the first depressed part is provided so as to be located upstream of the compression part of the sealing member in a separation direction in which the spigot separates from the socket. According to the above configuration, the sealing member is fitted to the outer circumferential surface of the spigot. The spigot is then moved in the insertion direction with respect to the sealing member, so that the spigot protrusion part is inserted in the first depressed part. This makes it possible to easily locate the sealing member along the outer circumferential surface of the spigot protrusion part.

A pipe joint in accordance with an aspect of the present invention is configured such that the separation preventive member is an annular member having a structure whose part is cut out; and the separation preventive member has a separation preventive body part and an engaging part, the separation preventive body part being located between the inner circumferential surface of the pushing ring and the outer circumferential surface of the spigot, the engaging part being engageable with the spigot protrusion part and protruding from the separation preventive body part in the insertion direction, the engaging part having a thickness, in the pipe-radial direction, which is thinner than a thickness, in the pipe-radial direction, of the separation preventive body part.

According to the above configuration, a diameter of the separation preventive member is expanded while the pipes are being connected. In so doing, the separation preventive member is fitted onto the outer circumferential surface of the spigot via the leading end part. The separation preventive member is then moved and gets through the spigot protrusion part so as to be located upstream of the spigot protrusion part in the separation direction of the spigot. After that, the diameter, of the separation preventive member, which has been expanded is shrunk (reduced). This allows the separation preventive member to be fitted onto the outer circumferential surface of the spigot.

The separation preventive member has a thickness which is thinner in the engaging part than in the separation preventive body part. Such a separation preventive member is prevented from being excessively rigid. This allows a reduction in force, which is required for expanding the diameter of the separation preventive member during pipe connection, and ultimately allows a reduction in time and effort for an operation of expanding the diameter of the separation preventive member. It is therefore possible to conduct an operation of pipe connection in a short period of time.

As such, even in a case where a separation force is caused to act on the spigot due to, for example, earthquakes after the first and second pipes are connected, it is possible to prevent the separation of the spigot from the socket because the spigot protrusion part will engage with the engaging part of the separation preventive member in the separation direction.

Note that, in order to stabilize an attachment posture of the separation preventive member, it is preferable to cause the separation preventive member to have a large width in the pipe-axial direction. Even in such a case, the above configuration allows a reduction in time and effort for the operation of expanding the diameter of the separation preventive member. It is therefore possible to conduct the operation of pipe connection in a short period of time.

A pipe joint in accordance with an aspect of the present invention is configured such that the engaging part is inserted in the first depressed part of the sealing member in the insertion direction; and the spigot protrusion part is located, in the pipe-axial direction, between the compression part of the sealing member and the engaging part of the separation preventive member.

According to the above configuration, the engaging part of the separation preventive member is inserted, in the insertion direction of the spigot, in the first depressed part of the sealing member. An end part of the sealing member therefore becomes hard to deform inward in the pipe-radial direction. This causes the sealing member to be stabilized in shape, and ultimately makes it possible to prevent a deterioration in sealing performance (water-tightness) of sealing member.

A pipe joint in accordance with an aspect of the present invention is configured to further include: a spacer provided between the sealing member and the pushing ring, the sealing member being deeply pushed into the socket by the pushing ring via the spacer, the spacer having a second depressed part on a side which makes contact with the sealing member, an end part of the sealing member being fitted in the second depressed part of the spacer.

According to the above configuration, the sealing member is deeply pushed into the socket by the pushing ring via the spacer. This makes it possible to prevent the sealing member from being pushed out of the socket due to, for example, a fluid pressure in the first and second pipes.

Note that, since an end part of the sealing member is fitted in the second depressed part of the spacer, it is possible to prevent the end part of the sealing member from being excessively deformed (moved) in the diameter-expanding direction. It is therefore possible to, while the pipes are being connected with use of the pipe joint, (i) prevent the end part of the sealing member from being caught between an opening end surface of the socket and the spacer and (ii) securely insert the sealing member between the outer circumferential surface of the spigot and the inner circumferential surface of the socket.

A pipe joint in accordance with an aspect of the present invention is configured to further include: a spacer provided between the sealing member and the pushing ring, the sealing member being deeply pushed into the socket by the pushing ring via the spacer, the spacer having a depressed part on a side which makes contact with the sealing member, an end part of the sealing member being fitted in the depressed part of the spacer.

According to the above configuration, the sealing member is deeply pushed into the socket by the pushing ring via the spacer. This makes it possible to prevent the sealing member from being pushed out of the socket due to, for example, a fluid pressure in the first and second pipes.

According to the above configuration, an end part of the sealing member is fitted into the depressed part of the spacer while the sealing member is being deeply pushed into the socket by the pushing ring via the spacer. This makes it possible to prevent the end part of the sealing member from (i) being deformed in the diameter-expanding direction and (ii) being caught between the spacer and the opening end part of the socket.

A pipe joint in accordance with an aspect of the present invention is configured such that the socket has a flange at its opening end part; and the spacer is sandwiched between the pushing ring and the socket so as to cause the pushing ring to be away from the flange of the socket.

According to the above configuration, the spacer is sandwiched between the pushing ring and the socket. This makes it possible to fix the spacer at a given attachment position.

A pipe joint in accordance with an aspect of the present invention is configured such that the depressed part has an inner diameter which is greater than an inner diameter of the spacer; and the depressed part has an outer diameter which is smaller than an outer diameter of the spacer.

A pipe joint in accordance with an aspect of the present invention is such that: a separation preventive member is provided between an inner circumferential surface of a pushing ring and an outer circumferential surface of a spigot, the separation preventive member engaging with a spigot protrusion part, which is provided on an outer circumferential surface of the spigot, in the pipe-axial direction so as to prevent a separation of the spigot from a socket; a sealing member has a compression part which is sandwiched between an outer circumferential surface of the spigot and an inner circumferential surface of the socket so as to be compressed in the pipe-radial direction, the sealing member being provided along the outer circumferential surface of the spigot protrusion part, the compression part being located, in the socket, upstream of the spigot protrusion part in an insertion direction in which the spigot is inserted.

According to the above configuration, the sealing member is provided along the outer circumferential surface of the spigot protrusion part while the pipes are being connected with use of the pipe joint. This allows the sealing member and the spigot protrusion part to overlap each other in the pipe-radial direction, and ultimately allows a reduction in length of a part extending from a leading end part of the spigot to the spigot protrusion part. It is therefore possible to reduce a length of a part extending from the opening end part of the socket to an inmost part in the socket. This ultimately allows the pipe joint to be downsized in the pipe-axial direction.

Furthermore, the compression part of the sealing member is sandwiched between the outer circumferential surface of the spigot and the inner circumferential surface of the socket so as to be compressed, in the pipe-radial direction, at a position, in the socket, upstream of the spigot protrusion part in the insertion direction. This causes a gap between the spigot and the socket to be filled up, and ultimately makes it possible to prevent a fluid in the pipes from leaking out from between the spigot and the socket.

As such, even in a case where a separation force is caused to act on the spigot due to, for example, earthquakes after the first and second pipes are connected, it is possible to prevent the separation of the spigot from the socket because the spigot protrusion part will engage with the engaging part of the separation preventive member in the separation direction.

A pipe joint in accordance with an aspect of the present invention is a pipe joint for connecting a first pipe and a second pipe, the first pipe having a socket, the second pipe having a spigot, the spigot being inserted in the socket, the spigot having a spigot protrusion part along its outer circumferential surface, the pipe joint including: a separation preventive member, configured to prevent a separation of the spigot from the socket, which is fitted onto the spigot, the separation preventive member being an annular member having a structure whose part is cut out, the separation preventive member having a body part and an engaging part, the engaging part being engageable with the spigot protrusion part and protruding from the body part in an insertion direction in which the spigot is inserted, the engaging part having a thickness, in a pipe-radial direction, which is thinner than a thickness, in the pipe-radial direction, of the body part.

According to the above configuration, a diameter of the separation preventive member is expanded while the pipes are being connected. In so doing, the separation preventive member is fitted onto the outer circumferential surface of the spigot via the leading end part. The separation preventive member is then moved and gets through the spigot protrusion part so as to be located upstream of the spigot protrusion part in the separation direction of the spigot. After that, the diameter, of the separation preventive member, which has been expanded is shrunk (reduced). This allows the separation preventive member to be fitted onto the outer circumferential surface of the spigot.

The separation preventive member has a thickness which is thinner in the engaging part than in the body part. Such a separation preventive member is prevented from being excessively rigid. This allows a reduction in force, which is required for expanding the diameter of the separation preventive member during pipe connection, and ultimately allows a reduction in time and effort for an operation of expanding the diameter of the separation preventive member. It is therefore possible to conduct an operation of pipe connection in a short period of time.

As such, even in a case where a separation force is caused to act on the spigot due to, for example, earthquakes after the first and second pipes are connected, it is possible to prevent the separation of the spigot from the socket because the spigot protrusion part will engage with the engaging part of the separation preventive member in the separation direction.

Note that, in order to stabilize an attachment posture of the separation preventive member, it is preferable to cause the separation preventive member to have a large width in the pipe-axial direction. Even in such a case, the above configuration allows a reduction in time and effort for the operation of expanding the diameter of the separation preventive member. It is therefore possible to conduct the operation of pipe connection in a short period of time.

A pipe joint in accordance with an aspect of the present invention is configured such that a sealing member having an annular shape is provided between an outer circumferential surface of a spigot and an inner circumferential surface of a socket, a pushing ring configured to deeply push the sealing member into the socket is fitted onto the spigot so as to face an opening end part of the socket from the outside, and a separation preventive member is provided between an inner circumferential surface of the pushing ring and the outer circumferential surface of the spigot, the sealing member having a compression part which is sandwiched between the outer circumferential surface of the spigot and the inner circumferential surface of the socket so as to be compressed in a pipe-radial direction, the compression part being located, in the socket, upstream of the spigot protrusion part in an insertion direction in which the spigot is inserted, According to the above configuration, the sealing member is provided along the outer circumferential surface of the spigot protrusion part while the pipes are being connected with use of the pipe joint. This allows the sealing member and the spigot protrusion part to overlap each other in the pipe-radial direction, and ultimately allows a reduction in length of a part extending from a leading end part of the spigot to the spigot protrusion part. It is therefore possible to reduce a length of a part extending from the opening end part of the socket to an inmost part in the socket. This ultimately allows the pipe joint to be downsized in the pipe-axial direction.

A pipe joint in accordance with an aspect of the present invention is configured such that the separation preventive member has a thickness-reduced part for facilitating deformation in a diameter-expanding direction.

According to the above configuration, the thickness-reduced part prevents the separation preventive member from being excessively rigid. This allows a reduction in force, which is required for expanding the diameter of the separation preventive member during pipe connection, to be further reduced, and ultimately allows a reduction in time and effort for the operation of expanding the diameter of the separation preventive member. It is therefore possible to conduct an operation of pipe connection in a short period of time.

A pipe joint in accordance with an aspect of the present invention is configured such that if the engaging part of the separation preventive member is set in an orientation, reverse to a normal orientation, in the pipe-axial direction, then a gap between the socket and the pushing ring is not set so as to be adjustable to a given gap.

According to the above configuration, in a case where the engaging part is erroneously set in an orientation, reverse to a normal orientation, while the separation preventive member is being fitted to the outer circumferential surface of the spigot, a gap between the socket and the pushing ring is not set so as to be adjustable to a given gap. This allows a worker to immediately recognize that the separation preventive member is reversely attached, so that the worker can correct the separation preventive member in the normal orientation.

A separation preventive member in accordance with an aspect of the present invention is a separation preventive member configured to prevent, in a pipe joint, a separation of a spigot of a second pipe from a socket of a first pipe, the pipe joint connecting the first pipe and the second pipe, the spigot being inserted in the socket, the spigot having a spigot protrusion part along its outer circumferential surface, the separation preventive member being an annular member having a structure whose part is cut out, the separation preventive member having a body part and an engaging part, the body part being fittable onto the spigot, the engaging part being engageable with the spigot protrusion part in a pipe-axial direction and protruding from the body part in an insertion direction in which the spigot is inserted, the engaging part having a thickness, in a pipe-radial direction, which is thinner than a thickness, in the pipe-radial direction, of the body part.

The separation preventive member has a thickness which is thinner in the engaging part than in the body part. Such a separation preventive member is prevented from being excessively rigid. This allows a reduction in force, which is required for expanding the diameter of the separation preventive member during pipe connection, and ultimately allows a reduction in time and effort for an operation of expanding the diameter of the separation preventive member. It is therefore possible to conduct an operation of pipe connection in a short period of time.

A method of connecting pipes in accordance with an aspect of the present invention is a method of connecting pipes by using a pipe joint in accordance with an aspect of the present invention, including the steps of: fitting the pushing ring onto the spigot so that the pushing ring is moved upstream of the spigot protrusion part in the separation direction; fitting the separation preventive member onto the spigot so that the separation preventive member is moved upstream of the spigot protrusion part in the separation direction so that the separation preventive member is located between the inner circumferential surface of the pushing ring and the outer circumferential surface of the spigot; fitting the sealing member onto the spigot so that the sealing member is located along the outer circumferential surface of the spigot protrusion part; and inserting the spigot in the socket while causing the pushing ring to push the sealing member.

The above method makes it possible to prevent, while inserting the spigot into the socket, (i) a mount failure that the compression part of the sealing member is caught between the leading end part of the spigot and the inmost part in the socket and (ii) a mount failure that the sealing member cannot be sufficiently inserted into the socket.

A method of connecting pipes in accordance with an aspect of the present invention is a method of connecting pipes by using a pipe joint in accordance with an aspect of the present invention, the method including the steps of: fitting the pushing ring onto the spigot; fitting an end part of the sealing member in a depressed part of the spacer so that the sealing member and the spacer are fitted onto the spigot; and inserting the spigot in the socket while causing the pushing ring to push the sealing member via the spacer.

According to the above method, an end part of the sealing member is fitted into the depressed part of the spacer while the sealing member is being pushed by the pushing ring via the spacer. This makes it possible to prevent the end part of the sealing member from (i) being deformed in the diameter-expanding direction and (ii) being caught between the spacer and the opening end part of the socket.

REFERENCE SIGNS LIST

1 Pipe joint
2 Pipe
3 Pipe
4 Socket
5 Spigot
7 Sealing member
8 Pushing ring
9 Spigot protrusion part
10 Locking ring (separation preventive member)
11 Spacer
16 Compression part
18 First depressed part
21 Ring body part (separation preventive body part)
22 Engaging part
24 Notch (thickness-reduced part)
31 Given gap
32 Second depressed part
61 Pushing ring
A Separation direction of spigot
B Insertion direction of spigot
T1 Thickness, in pipe-radial direction, of engaging part
T2 Thickness, in pipe-radial direction, of ring body part

The invention claimed is:

1. A pipe joint for connecting a first pipe and a second pipe, the first pipe having a socket, the second pipe having a spigot, the spigot being inserted in the socket, the spigot having a spigot protrusion part along an outer circumferential surface of the spigot, said pipe joint comprising:
a sealing member, having an annular shape, which is provided between the outer circumferential surface of the spigot and an inner circumferential surface of the socket, a portion of the sealing member being configured to be between the spigot protrusion part and the inner circumferential surface of the socket in a pipe-radial direction;
a pushing ring configured to push the sealing member into the socket, the pushing ring being fitted onto the spigot so as to face an opening end part of the socket from the outside; and
a separation preventive member configured to engage with the spigot protrusion part in a pipe-axial direction so as to prevent a separation of the spigot from the socket, the separation preventive member being provided between an inner circumferential surface of the pushing ring and the outer circumferential surface of the spigot,
the sealing member being provided along an outer circumferential surface of the spigot protrusion part and having a compression part between the outer circumferential surface of the spigot and the inner circumferential surface of the socket,
the compression part being compressed in the pipe-radial direction,
the compression part being located, in the socket, upstream of the spigot protrusion part in an insertion direction in which the spigot is inserted,
the separation preventive member being an annular member having a structure whose part is cut out, and
the separation preventive member having a separation preventive body part and an engaging part, the separation preventive body part being located between the inner circumferential surface of the pushing ring and the outer circumferential surface of the spigot, the engaging part being engageable with the spigot protrusion part and protruding from the separation preventive body part in the insertion direction, the engaging part having a thickness, in the pipe-radial direction, which is thinner than a thickness, in the pipe-radial direction, of the separation preventive body part.

2. The pipe joint as set forth in claim 1, wherein:
the sealing member has, on an inner circumferential surface, a first depressed part in which the spigot protrusion part is inserted in the insertion direction; and
the first depressed part is provided so as to be located upstream of the compression part of the sealing member in a separation direction in which the spigot separates from the socket.

3. The pipe joint as set forth in claim 1, wherein:
the engaging part is inserted in a first depressed part of the sealing member in the insertion direction; and
the spigot protrusion part is located, in the pipe-axial direction, between the compression part of the sealing member and the engaging part of the separation preventive member.

4. A method of connecting pipes by using a pipe joint as set forth in claim 1, the method comprising:
fitting the pushing ring onto the spigot so that the pushing ring is moved upstream of the spigot protrusion part in the separation direction;

fitting the separation preventive member onto the spigot so that the separation preventive member is moved upstream of the spigot protrusion part in the separation direction so that the separation preventive member is located between the inner circumferential surface of the pushing ring and the outer circumferential surface of the spigot;

fitting the sealing member onto the spigot so that the sealing member is located along the outer circumferential surface of the spigot protrusion part; and inserting the spigot in the socket while causing the pushing ring to push the sealing member.

5. The pipe joint as set forth in claim 1, further comprising:

a spacer provided between the sealing member and the pushing ring, the sealing member being pushed into the socket by the pushing ring via the spacer, the spacer having a second depressed part on a side which makes contact with the sealing member, an end part of the sealing member being fitted in the second depressed part of the spacer.

6. The pipe joint as set forth in claim 5, wherein:
the socket has a flange at its opening end part; and
the spacer is between the pushing ring and the socket so as to cause the pushing ring to be away from the flange of the socket.

7. The pipe joint as set forth in claim 5, wherein:
the spacer is an annular member;
the second depressed part has an inner diameter which is greater than an inner diameter of the spacer; and
the second depressed part has an outer diameter which is smaller than an outer diameter of the spacer.

8. A method of connecting pipes by using a pipe joint as set forth in claim 5, the method comprising:

fitting the pushing ring onto the spigot;

fitting an end part of the sealing member in the second depressed part of the spacer so that the sealing member and the spacer are fitted onto the spigot; and inserting the spigot in the socket while causing the pushing ring to push the sealing member via the spacer.

9. The pipe joint as set forth in claim 1, wherein
the sealing member has, on an inner circumferential surface, a first depressed part in which the spigot protrusion part is inserted in the insertion direction, and
the sealing member has a surface which forms the first depressed part, and a part of the surface which part faces the engaging part is separated from the engaging part in a pipe-axial direction.

10. The pipe joint as set forth in claim 1, wherein the separation preventive member is provided between the inner circumferential surface of the pushing ring and the outer circumferential surface of the spigot in the pipe-radial direction.

11. A pipe joint for connecting a first pipe and a second pipe, the first pipe having a socket, the second pipe having a spigot, the spigot being inserted in the socket, the spigot having a spigot protrusion part along an outer circumferential surface of the spigot, said pipe joint comprising: a sealing member, having an annular shape, which is provided between the outer circumferential surface of the spigot and an inner circumferential surface of the socket;

a pushing ring configured to push the sealing member into the socket, the pushing ring being fitted onto the spigot so as to face an opening end part of the socket from the outside; and a separation preventive member configured to engage with the spigot protrusion part in a pipe-axial direction so as to prevent a separation of the spigot from the socket, the separation preventive member being provided between an inner circumferential surface of the pushing ring and the outer circumferential surface of the spigot, the sealing member being provided along an outer circumferential surface of the spigot protrusion part, and having a compression part between the outer circumferential surface of the spigot and the inner circumferential surface of the socket, the compression part being compressed in a pipe-radial direction, and the compression part being located in the socket, upstream of the spigot protrusion part in an insertion direction in which the spigot is inserted; and a spacer provided between the sealing member and the pushing ring, the sealing member being pushed into the socket by the pushing ring via the spacer, the spacer having a second depressed part on a side which makes contact with the sealing member, and an end part of the sealing member being fitted in the second depressed part of the spacer.

12. The pipe joint as set forth in claim 11, wherein:
the socket has a flange at its opening end part; and
the spacer is between the pushing ring and the socket so as to cause the pushing ring to be away from the flange of the socket.

13. The pipe joint as set forth in claim 11, wherein:
the spacer is an annular member;
the second depressed part has an inner diameter which is greater than an inner diameter of the spacer; and
the second depressed part has an outer diameter which is smaller than an outer diameter of the spacer.

14. A method of connecting pipes by using a pipe joint as set forth in claim 11, the method comprising:

fitting the pushing ring onto the spigot;

fitting an end part of the sealing member in the second depressed part of the spacer so that the sealing member and the spacer are fitted onto the spigot; and inserting the spigot in the socket while causing the pushing ring to push the sealing member via the spacer.

\* \* \* \* \*

UNITED STATES PATENT AND TRADEMARK OFFICE
CERTIFICATE OF CORRECTION

PATENT NO. : 11,384,875 B2
APPLICATION NO. : 16/088482
DATED : July 12, 2022
INVENTOR(S) : Takahiro Ishihara et al.

It is certified that error appears in the above-identified patent and that said Letters Patent is hereby corrected as shown below:

On the Title Page

Item (73) should read:
(73) Assignee: KUBOTA CORPORATION, Osaka (JP)

Signed and Sealed this
First Day of November, 2022

Katherine Kelly Vidal
*Director of the United States Patent and Trademark Office*